US011877143B2

(12) United States Patent
Raghuvanshi et al.

(10) Patent No.: US 11,877,143 B2
(45) Date of Patent: Jan. 16, 2024

(54) PARAMETERIZED MODELING OF COHERENT AND INCOHERENT SOUND

(71) Applicant: Microsoft Technology Licensing, LLC, Redmond, WA (US)

(72) Inventors: Nikunj Raghuvanshi, Redmond, WA (US); Andrew Stewart Allen, San Diego, CA (US); John Michael Snyder, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 17/565,878

(22) Filed: Dec. 30, 2021

(65) Prior Publication Data

US 2023/0179945 A1 Jun. 8, 2023

Related U.S. Application Data

(60) Provisional application No. 63/285,873, filed on Dec. 3, 2021.

(51) Int. Cl.
*H04S 7/00* (2006.01)

(52) U.S. Cl.
CPC .............. *H04S 7/305* (2013.01); *H04S 7/303* (2013.01); *H04S 2400/01* (2013.01); *H04S 2420/01* (2013.01)

(58) Field of Classification Search
None
See application file for complete search history.

(56) References Cited

U.S. PATENT DOCUMENTS

| | | | | |
|---|---|---|---|---|
| 9,769,585 | B1 | 9/2017 | Hills | |
| 10,206,055 | B1 | 2/2019 | Mindlin et al. | |
| 10,932,081 | B1 | 2/2021 | Raghuvanshi et al. | |
| 11,200,906 | B2 * | 12/2021 | Lee | G10L 19/008 |

(Continued)

FOREIGN PATENT DOCUMENTS

| | | | | |
|---|---|---|---|---|
| CA | 2918279 C * | 8/2018 | | G10K 15/08 |
| CN | 1172320 A | 2/1998 | | |

(Continued)

OTHER PUBLICATIONS

"International Search Report and Written Opinion Issued in PCT Application No. PCT/US22/048640", dated Mar. 6, 2023, 15 Pages.

(Continued)

*Primary Examiner* — Qin Zhu
(74) *Attorney, Agent, or Firm* — Rainier Patents, P.S.

(57) ABSTRACT

The description relates to representing acoustic characteristics of real or virtual scenes. One method includes generating directional impulse responses for a scene. The directional impulse responses can correspond to sound departing from multiple sound source locations and arriving at multiple listener locations in the scene. The method can include processing the directional impulse responses to obtain coherent sound signals and incoherent sound signals. The method can also include encoding first perceptual acoustic parameters from the coherent sound signals and second perceptual acoustic parameters from the incoherent sound signals, and outputting the encoded first perceptual acoustic parameters and the encoded second perceptual acoustic parameters.

20 Claims, 13 Drawing Sheets

Encoder 700

(56) References Cited

U.S. PATENT DOCUMENTS

| | | | | |
|---|---|---|---|---|
| 2005/0080616 | A1 | 4/2005 | Leung et al. | |
| 2011/0081023 | A1 | 4/2011 | Raghuvanshi | |
| 2012/0269355 | A1 | 10/2012 | Chandak et al. | |
| 2013/0120569 | A1 | 5/2013 | Mizuta | |
| 2014/0016784 | A1 | 1/2014 | Sen et al. | |
| 2014/0219458 | A1 | 8/2014 | Tanaka et al. | |
| 2014/0307877 | A1 | 10/2014 | Sumioka et al. | |
| 2015/0373475 | A1* | 12/2015 | Raghuvanshi ......... | G10K 15/02 381/303 |
| 2016/0212563 | A1 | 7/2016 | Yuyama et al. | |
| 2016/0337779 | A1 | 11/2016 | Davidson et al. | |
| 2018/0035233 | A1 | 2/2018 | Fielder et al. | |
| 2018/0091920 | A1 | 3/2018 | Family | |
| 2018/0109900 | A1 | 4/2018 | Lyren et al. | |
| 2019/0313201 | A1 | 10/2019 | Torres et al. | |
| 2019/0356999 | A1* | 11/2019 | Raghuvanshi .......... | H04S 7/304 |
| 2020/0388291 | A1 | 12/2020 | Lee et al. | |
| 2021/0058730 | A1* | 2/2021 | Raghuvanshi .......... | H04S 7/303 |
| 2021/0235214 | A1 | 7/2021 | Raghuvanshi et al. | |
| 2021/0266693 | A1* | 8/2021 | Raghuvanshi ......... | H04R 5/027 |
| 2021/0287651 | A1* | 9/2021 | Eronen .................... | H04S 7/305 |

FOREIGN PATENT DOCUMENTS

| | | | | |
|---|---|---|---|---|
| EP | 1437712 A2 | 7/2004 | | |
| GB | 2593170 A * | 9/2021 | ............. | H04S 7/305 |

OTHER PUBLICATIONS

"Final Office Action Issued in U.S. Appl. No. 16/103,702", dated Aug. 26, 2019, 32 Pages.
"Non Final Office Action Issued in U.S. Appl. No. 16/103,702", dated Mar. 15, 2019, 26 Pages.
"Non-Final Office Action Issued in U.S. Appl. No. 16/548,645", dated May 27, 2020, 14 Pages.
"Final Office Action Issued in U.S. Appl. No. 17/152,375", dated Nov. 5, 2021, 17 Pages.
"Notice of Allowance Issued in U.S. Appl. No. 17/152,375", dated Apr. 13, 2022, 8 Pages.
"Office Action and Search Report Issued in China Patent Application No. 201980031831.6", dated Jun. 10, 2021, 8 Pages.
Allen, et al., "Aerophones in Flatland: Interactive Wave Simulation of Wind Instruments", In Journal ACM Transactions on Graphics (TOG) TOG Homepage, vol. 34, Issue 4, Aug. 2015, 11 Pages.
Bilbao, et al., "Directional Sources in Wave-Based Acoustic Simulation", In Proceeding of IEEE/ACM Transactions on Audio, Speech, and Language Processing vol. 27 , Issue 2, Feb. 2019, 14 Pages.
Cao, et al., "Interactive Sound Propagation with Bidirectional Path Tracing", In Journal ACM Transactions on Graphics (TOG) TOG Homepage, vol. 35 Issue 6, Nov. 2016, 11 Pages.
Chadwick, et al., "Harmonic shells: a practical nonlinear sound model for near-rigid thin shells", In Proceeding of SIGGRAPH Asia ACM SIGGRAPH Asia papers, Article No. 119, Dec. 16, 2009, 10 Pages.
Chaitanya, et al., "Adaptive Sampling for Sound Propagation", In Proceedings of IEEE Transactions on Visualization and Computer Graphics, vol. 25, Issue 5, May 2019, 9 Pages.
Gumerov, et al., "Fast Multipole Methods for the Helmholtz Equation in Three Dimensions", 2005, 11 Pages.
Huopaniemi, et al., "Creating Interactive Virtual Auditory Environments", In IEEE Computer Graphics and Applications, vol. 22, Issue 4, Jul. 1, 2002, pp. 49-57.
James, et al., "Precomputed acoustic transfer: output-sensitive, accurate sound generation for geometrically complex vibration sources", In Journal of ACM Transactions on Graphics (TOG) TOG Homepage vol. 25, Issue 3, Jul. 2006, 9 Pages.
Litovsky, et al., "The precedence effect", In The Journal of the Acoustical Society of America 106, 1633, 1999, pp. 1633-1654.
Manocha, et al., "Interactive Sound Rendering", Published in SIGGRAPH: ACM SIGGRAPH Courses, Aug. 2009, 338 Pages.
Mehra, et al., "Source and Listener Directivity for Interactive Wave-Based Sound Propagation.", In Proceedings of IEEE Transactions on Visualization and Computer Graphics vol. 20 , Issue: 4, Apr. 2014, pp. 495-503.
Menzer, et al., "Efficient Binaural Audio Rendering Using Independent Early and Diffuse Paths", In 132nd Audio Engineering Society Convention, Apr. 26, 2012, 9 Pages.
"International Search Report and Written Opinion Issued in PCT Application No. PCT/US20/037855", dated Oct. 5, 2020, 14 Pages.
"International Search Report and Written Opinion Issued in PCT Application No. PCT/US2019/029559", dated Jul. 12, 2019, 14 Pages.
Pierce, Allan D. , "Acoustics: An Introduction to Its Physical Principles and Applications", In The Journal of the Acoustical Society of America 70, 1548, Nov. 1981, 2 Page.
Pulkki, Ville, "Spatial Sound Reproduction with Directional Audio Coding", In Journal of the Audio Engineering Society, vol. 55, Issue 6, Jun. 15, 2007, pp. 503-516.
Raghuvanshi, et al., "Efficient and Accurate Sound Propagation Using Adaptive Rectangular Decomposition", In Proceedings of IEEE Transactions on Visualization and Computer Graphics, vol. 15 , Issue 5, Sep. 2009, 10 Pages.
Raghuvanshi, et al., "Parametric Directional Coding for Precomputed Sound Propagation", In Journal of ACM Transactions on Graphics (TOG) TOG Homepage archive, vol. 37, Issue 4, Aug. 2018, 14 Pages.
Raghuvanshi, et al., "Parametric Wave Field Coding for Precomputed Sound Propagation", In Journal ACM Transactions on Graphics (TOG) TOG Homepage, vol. 33, Issue 4, Jul. 2014, 11 Pages.
Raghuvanshi, et al., "Precomputed Wave Simulation for Real-Time Sound Propagation of Dynamic Sources in Complex Scenes", In Journal of ACM Transactions on Graphics, vol. 29, Issue 4, Jul. 26, 2010, 11 Pages.
Zhang, et al., "Ambient Sound Propagation", In Journal of ACM Transactions on Graphics (TOG) vol. 37, Issue 6, Nov. 2018, 10 Pages.
Savioja, et al., "Overview of geometrical room acoustic modeling techniques", The Journal of the Acoustical Society of America 138, Retrieved from: https://asa.scitation.org/doi/full/10.1121/1.4926438, Aug. 1, 2015, pp. 708-730.
Savioja, Lauri, "Real-Time 3D Finite-Difference Time-Domain Simulation of Mid-Frequency Room Acoustics", In 13th International Conference on Digital Audio Effects, Sep. 6, 2010, 8 Pages.
Urbanietz, et al., "Binaural Rendering for Sound Navigation and Orientation", In Proceedings of 4th VR Workshop on Sonic Interactions for Virtual Environments, Mar. 18, 2018, 5 Pages.
Wang, et al., "Toward Wave-based Sound Synthesis for Computer Animation", In Journal of ACM Transactions on Graphics (TOG) vol. 37, Issue 4, Jul. 2018, 16 Pages.
Yujun, et al., "Research on Immersive Virtual Battlefield 3D Sound Effect Simulation", In Journal of Ordnance Industry Automation, vol. 36, Issue 1, Mar. 20, 2017, pp. 59-63.
"Project Acoustics: Making Waves with Triton", https://www.youtube.com/watch?v=plzwo-MxCC8, Mar. 20, 2019, 4 Pages.
"Project Triton: Immersive sound propagation for games and mixed reality", Retrieved From: https://web.archive.org/web/20210514143905/https://www.microsoft.com/en-us/research/project/project-triton/, May 14, 2021, 7 Pages.
"What is Project Acoustics?", https://docs.microsoft.com/en-us/gaming/acoustics/what-is-acoustics, Apr. 26, 2021, 5 Pages.
"Office Action Issued in Indian Patent Application No. 202017049285", dated Aug. 16, 2022, 5 Pages.
"Office Action issued in European Patent Application No. 19727162.0", dated Nov. 28, 2022, 4 Pages.

* cited by examiner

PARAMETERIZED MODELING OF COHERENT AND INCOHERENT SOUND

BACKGROUND

Practical modeling and rendering of real-time acoustic effects (e.g., sound, audio) for video games, virtual reality applications, or architectural acoustic applications can be quite complex. It is difficult to render authentic, convincing sound when constrained by reasonable computational budgets. For instance, conventional real-time path tracing methods demand enormous sampling to produce smooth results. Alternatively, precomputed wave-based techniques can be used to represent acoustic parameters (e.g., loudness, reverberation level) of a scene at lower runtime costs. However, precomputed wave-based techniques may rely on simplifying assumptions about sound perception that impact the quality of rendered sound.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for representing acoustic characteristics of real or virtual scenes. One example includes a method or technique that can be performed on a computing device. The method or technique can include generating directional impulse responses for a scene. The directional impulse responses can correspond to sound departing from multiple sound source locations and arriving at multiple listener locations in the scene. The method or technique can also include processing the directional impulse responses to obtain coherent sound signals and incoherent sound signals. The method or technique can also include encoding first perceptual acoustic parameters from the coherent sound signals and second perceptual acoustic parameters from the incoherent sound signals. The method or technique can also include outputting the encoded first perceptual acoustic parameters and the encoded second perceptual acoustic parameters.

Another example includes a system having a hardware processing unit and a storage resource storing computer-readable instructions. When executed by the hardware processing unit, the computer-readable instructions can cause the system to receive an input sound signal for a sound source having a source location in a scene. The computer-readable instructions can also cause the system to identify encoded first perceptual acoustic parameters and encoded second perceptual acoustic parameters for a listener location in the scene. The encoded first perceptual acoustic parameters can represent characteristics of coherent sound signals departing the source location and arriving at the listener location. The encoded second perceptual acoustic parameters can represent characteristics of incoherent sound signals departing the source location and arriving at the listener location. The computer-readable instructions can also cause the system to render coherent sound at the listener location based at least on the input sound signal and the encoded first perceptual acoustic parameters, and render incoherent sound at the listener location based at least on the input sound signal and the encoded second perceptual acoustic parameters.

Another example includes a computer-readable storage medium. The computer-readable storage medium can store instructions which, when executed by a computing device, cause the computing device to perform acts. The acts can include processing directional impulse responses corresponding to sound departing from multiple sound source locations and arriving at multiple listener locations in a scene to obtain coherent sound signals and incoherent sound signals. The acts can also include encoding first perceptual acoustic parameters from the coherent sound signals and second perceptual acoustic parameters from the incoherent sound signals. The acts can also include outputting the encoded first perceptual acoustic parameters and the encoded second perceptual acoustic parameters. The encoded first perceptual acoustic parameters can provide a basis for subsequent rendering of coherent sound and the encoded second perceptual acoustic parameters can provide a basis for subsequent rendering of incoherent sound traveling from various source locations to various listener locations in the scene.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the FIG. and associated discussion where the reference number is first introduced.

DETAILED DESCRIPTION

Sound Perception Overview

Figure 1:
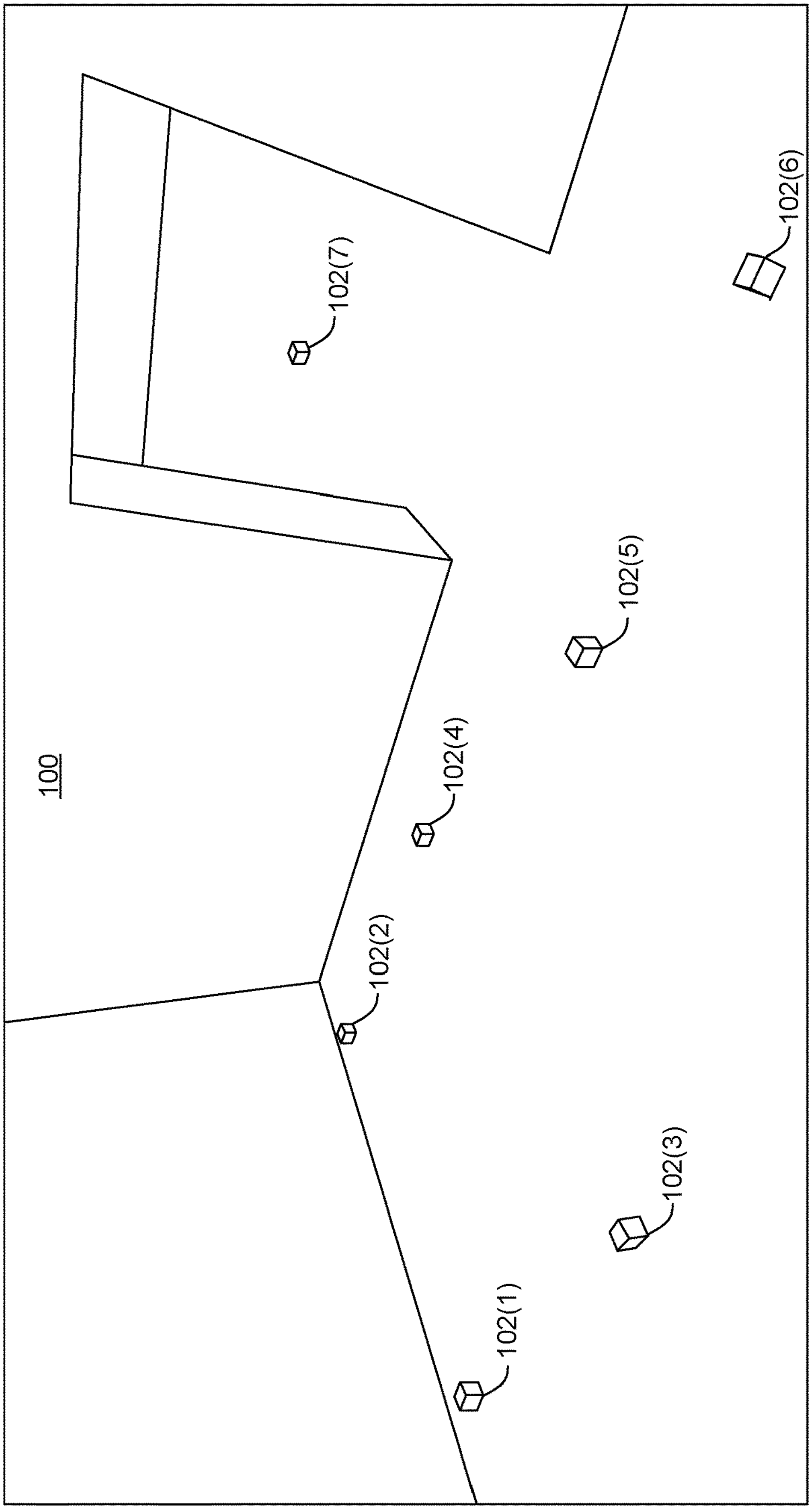
FIG. 1 illustrates a scenario of acoustic probes deployed in a virtual scene, consistent with some implementations of the present concepts.

As noted above, modeling and rendering of real-time acoustic effects can be very computationally intensive. As a consequence, it can be difficult to render realistic acoustic effects without sophisticated and expensive hardware. For instance, modeling acoustic characteristics of a real or virtual scene while allowing for movement of sound sources and listeners presents a difficult problem, particularly for complex scenes.

One important factor to consider in modeling acoustic effects of a scene relates to the delay of sound arriving at the listener. Generally, the time at which sound waves are received by a listener conveys important information to the listener. For instance, for a given wave pulse introduced by a sound source into a scene, the pressure response arrives at the listener as a series of peaks, each of which represents a different path that the sound takes from the source to the listener. The timing, arrival direction, and sound energy of each peak are dependent upon various factors, such the location of the sound source, the location of the listener, the geometry of structures present the scene, and the materials of which those structures are composed.

Listeners tend to perceive the direction of the first-arriving peak in the impulse response as the arrival direction of the sound, even when nearly-simultaneous peaks arrive shortly thereafter from different directions. This is known as the "precedence effect." This initial sound can take the shortest path through the air from a sound source to a listener in a given scene. After the initial sound, subsequent coherent reflections (echoes) are received that generally take longer paths reflecting off of various surfaces in the scene and become attenuated over time. In addition, humans can perceive reverberant noise together with initial sound and subsequent echoes.

Generally speaking, initial sounds tend to enable listeners to perceive where the sound is coming from. Subsequent echoes and/or reverberations tend to provide listeners with additional information about the scene because they convey how the directional impulse response travels along many different paths within the scene. For instance, echoes can be perceived differently by the user depending on properties of the scene. As an example, when a sound source and listener are nearby (e.g., within footsteps), a delay between arrival of the initial sound and corresponding first echoes can become audible. The delay between the initial sound and the echoes can strengthen the perception of distance to walls.

Initial sound and subsequent echoes can be produced by coherent sound waves that have the same frequency and a particular phase relationship, e.g., in-phase with one another. On the other hand, reverberations can be produced by incoherent sound waves having many different frequencies and phases. The disclosed implementations can separate sound signal into coherent and incoherent components, and encode separate parameter sets for the coherent and incoherent components. These separate parameters provide a basis for subsequent rendering of coherent sound and incoherent sound traveling from different source locations to different listener locations within the scene.

Parameterized Approaches

One high-level approach for reducing the computational burden of rendering sound involves precomputing acoustic parameters characterizing how sound travels from different source locations to different listener locations in a given virtual scene. Once these acoustic parameters are precomputed, they are invariant provided that the scene does not change. Here, the term "precompute" is used to refer to determining acoustic parameters of a scene offline, while the term "runtime" refers to using those acoustic parameters during execution of an application to perform actions such as rendering sound to account for changes to source location and/or listener location.

One simplifying assumption for parameterizing sound in a given scene is to designate different non-overlapping temporal periods for initial sound, reflections, and reverberations. Initial sound can be modeled as coherent sound in a first time period, coherent reflections can be modeled as coherent sound in a second time period, and reverberations can be modeled as decaying noise in a third time period. This approach can provide sufficient fidelity for certain applications such as video games while providing compact encodings, because initial sound and coherent reflections tend to predominate human perception of sound that arrives early at the listener for a given sound event, and reverberations tend to predominate perception of later-arriving sound.

However, as noted previously, humans can perceive coherent and incoherent sound waves simultaneously. In other words, humans can perceive reverberant noise together with initial sound and coherent reflections. Some applications may benefit from more accurate modeling of sound that reproduces coherent and incoherent sound together in the same time period. Furthermore, in applications such as architectural acoustics, there may be greater computational budgets to accommodate additional parameterized data for separately representing characteristics of coherent and incoherent sound.

Note that coherent sound signals and incoherent sound signals can have very different characteristics that vary with source and listener location in a scene. Approaches that extract parameters from the full impulse response pressure signal may not accurately represent different characteristics of coherent and incoherent sound signals. The disclosed implementations can address these issues and generate convincing sound for various applications, such as architectural acoustics, by splitting the impulse response pressure signal into separate coherent and incoherent components. Separate parameter sets can be derived for the coherent and incoherent components, thus allowing greater fidelity that allows for simultaneous rendering of coherent and incoherent sound components.

By separating sound signals into coherent and incoherent components prior to parameter extraction, first parameters used to represent coherent sound can be derived from a coherent sound signal component with relatively little sound energy from incoherent sound waves, and second parameters used to represent incoherent sound can be derived from an incoherent sound signal component with relatively little sound energy from incoherent sound waves. Thus, incoherent sound has relatively little impact on the first parameters that represent coherent sound, and coherent sound has relatively little impact on the second parameters that represent incoherent sound. This is in contrast to previous approaches that derive parameters from the full impulse response, which allows incoherent sound to influence parameters used to represent initial sound and echoes and also allows coherent sound to influence parameters used to represent reverberations.

Thus, the disclosed implementations offer computationally efficient mechanisms for accurately modeling and rendering of acoustic effects that account for different characteristics of coherent and incoherent sound in a given scene. Generally, the disclosed implementations can model a given scene using perceptual parameters that represent how sound is perceived at different source and listener locations within the scene. Once perceptual parameters have been obtained for a given scene as described herein, the perceptual parameters can be used for rendering of sound traveling from arbitrary source and listener positions in the scene, e.g., by interpolating stored parameters for source and listener locations that are nearby the runtime source and listener positions.

Probing

As noted previously, the disclosed implementations can precompute acoustic parameters of a scene and then use the precomputed information at runtime to render sound. Generally, these precomputed acoustic parameters can be considered "perceptual" parameters because they describe how sound is perceived by listeners in the scene depending on the location of the sound source and listener.

To determine the perceptual parameters for a given virtual scene, acoustic probes can be deployed at various locations as described below. FIG. 1 shows an example of probing a scene 100. Individual probes 102(1)-102(7) are deployed throughout the scene at various locations where listeners can appear at runtime.

In some implementations, simulations can be employed to model the travel of sound between selected locations in a given scene. For instance, sound sources can be deployed at given source locations and each probe can act as a listener at the corresponding probe location. In some implementations, sound sources can be deployed in a three-dimensional grid of square voxels of approximately one cubic meter (not shown), with one sound source per voxel.

Simulations can be carried out for each combination of sound sources and listener probes in the scene, as described more below. For instance, wave simulations can be employed to model acoustic diffraction in the scene. The wave simulations can be used to determine how sound will be perceived by listeners at different locations in the scene depending on the location of the sound source. Then, perceptual acoustic parameters can be stored representing this information. For instance, the perceptual acoustic parameters can include first perceptual parameters representing characteristics of coherent signals traveling from source locations to listener locations, and second perceptual parameters representing characteristics of incoherent signals traveling from the source locations to the listener locations.

Note that the disclosed implementations are not limited to virtual scenes. For real-world scenes, actual sound sources (speakers) can be deployed as sound sources, with microphones acting as listeners at designated locations in the real-world scene. Instead of simulating the directional impulse response of a virtual sound source at a virtual listener, the speakers can play actual sounds that are recorded by the microphones and then the recordings can be processed to derive perceptual parameters as discussed elsewhere herein.

Sound Propagation Example

Figure 2A:
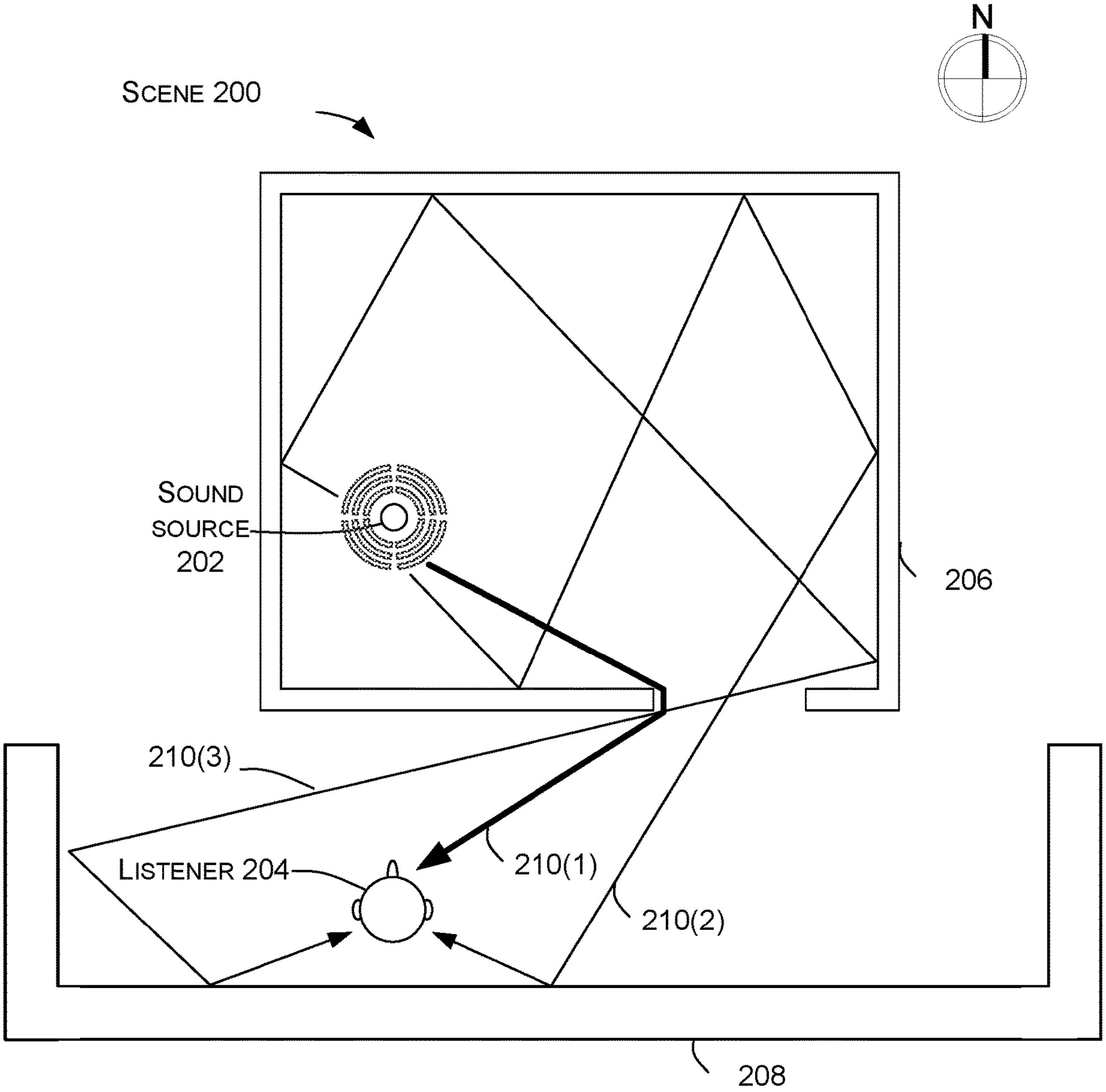
FIGS. 2A, 2B, 2C, and 2D illustrate scenarios related to propagation of sound, consistent with some implementations of the present concepts.

As noted, each probe can be used to precompute acoustic parameters relating to different characteristics of how coherent and incoherent sound are perceived by a listener at the probed location. FIG. 2A illustrates a scenario that conveys certain concepts relating to travel of sound in a scene 200. For the purposes of this example, sound is emitted by a sound source 202 and is perceived by a listener 204 based on acoustic properties of scene 200. For instance, scene 200 can have acoustic properties based on geometry of structures within the scene as well as materials of those structures. For example, the scene can have structures such as walls 206 and 208.

As used herein, the term "geometry" can refer to an arrangement of structures (e.g., physical objects) and/or open spaces in a scene. Generally, the term "scene" is used herein to refer to any environment in which real or virtual sound can travel, and a "virtual" scene includes any scene with at least one virtual structure. In some implementations, structures such as walls can cause occlusion, reflection, diffraction, and/or scattering of sound, etc. Some additional examples of structures that can affect sound are furniture, floors, ceilings, vegetation, rocks, hills, ground, tunnels, fences, crowds, buildings, animals, stairs, etc. Additionally, shapes (e.g., edges, uneven surfaces), materials, and/or textures of structures can affect sound. Note that structures do not have to be solid objects. For instance, structures can include water, other liquids, and/or types of air quality that might affect sound and/or sound travel.

Generally, the sound source 202 can generate sound pulses that create corresponding directional impulse responses. The directional impulse responses depend on properties of the scene 200 as well as the locations of the sound source and listener. The first-arriving peak in the directional impulse response is typically perceived by the listener 204 as an initial sound, and subsequent peaks in the directional impulse response tend to be perceived as echoes. Note that this document adopts the convention that the top of the page faces north for the purposes of discussing directions.

A given sound pulse can result in many different sound wavefronts that propagate in all directions from the source. FIG. 2 shows three coherent sound wavefronts 210(1), 210(2), and 210(3). Because of the acoustic properties of scene 200 and the respective positions of the sound source 202 and the listener 204, the listener perceives initial sound wavefront 210(1) as arriving from the northeast. For instance, in a virtual reality world based on scene 200, a person (e.g., listener) looking at a wall with a doorway to their right would likely expect to hear a sound coming from their right side, as wall 206 attenuates the sound energy that travels along the line of sight between the sound source and the listener.

The sound perceived by listener 204 can also include sound wavefronts 210(2) and 210(3) after the initial sound wavefront. Each of these three wavefronts can include coherent sound that arrive at the user at different times and from different locations. As discussed more below, coherent sound wavefronts departing from a sound source can be represented in different time bins (e.g., of monotonically increasing duration) depending on their arrival times at the listener. In some cases, the precedence effect can be modeled by selecting the duration of the first time bin so that initial sound paths appear within the first time bin.

Figure 2B:
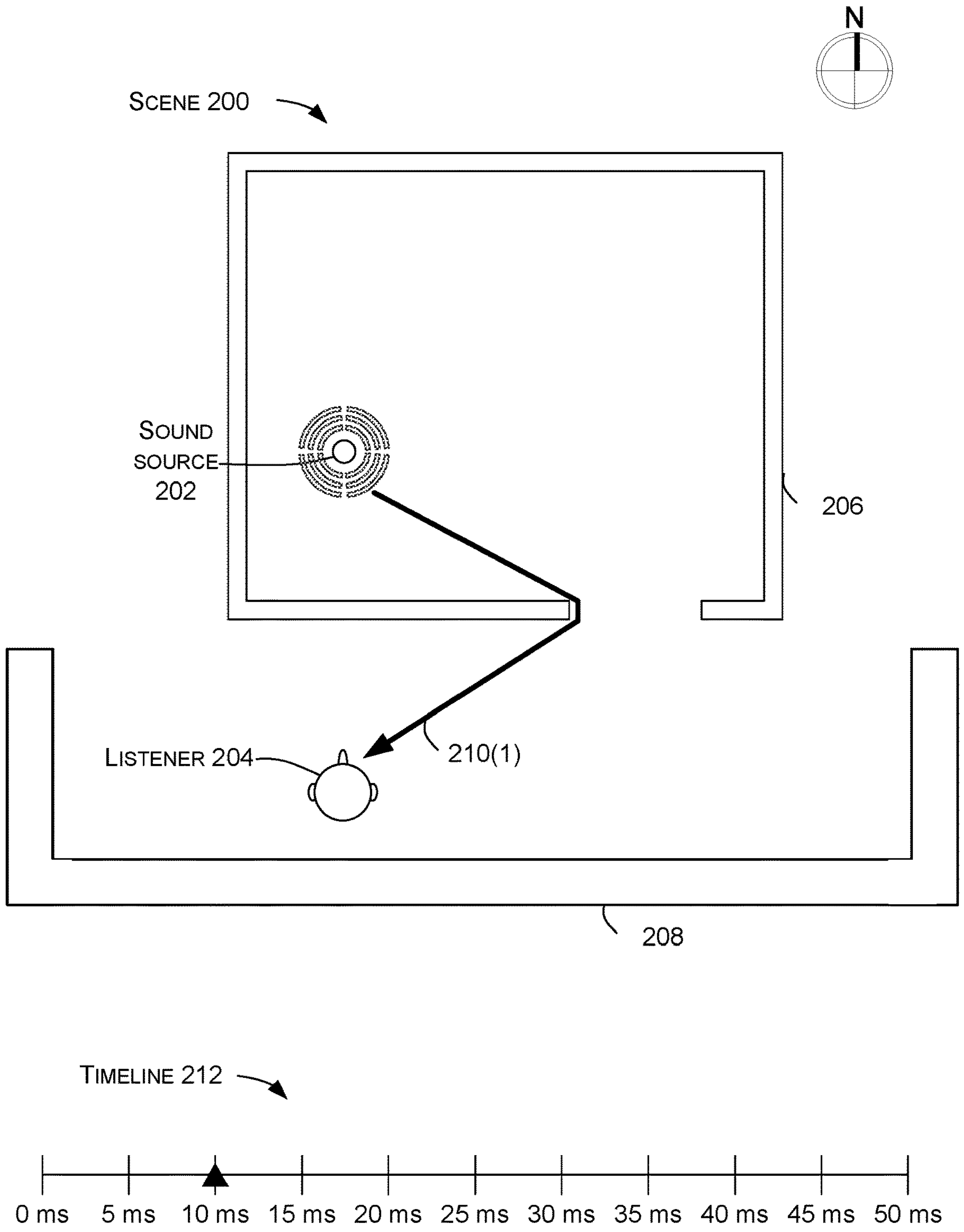
Figure 2C:
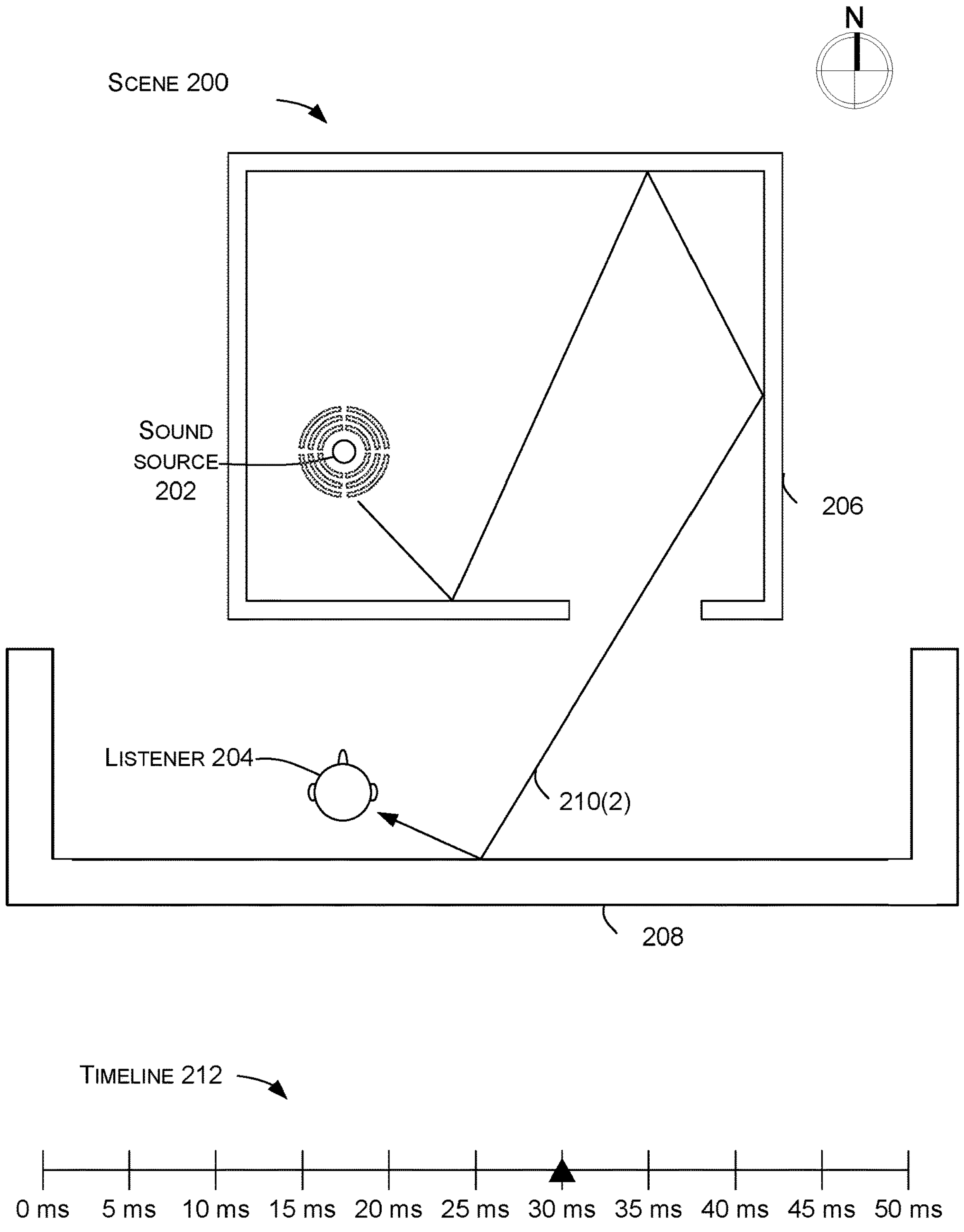
Figure 2D:
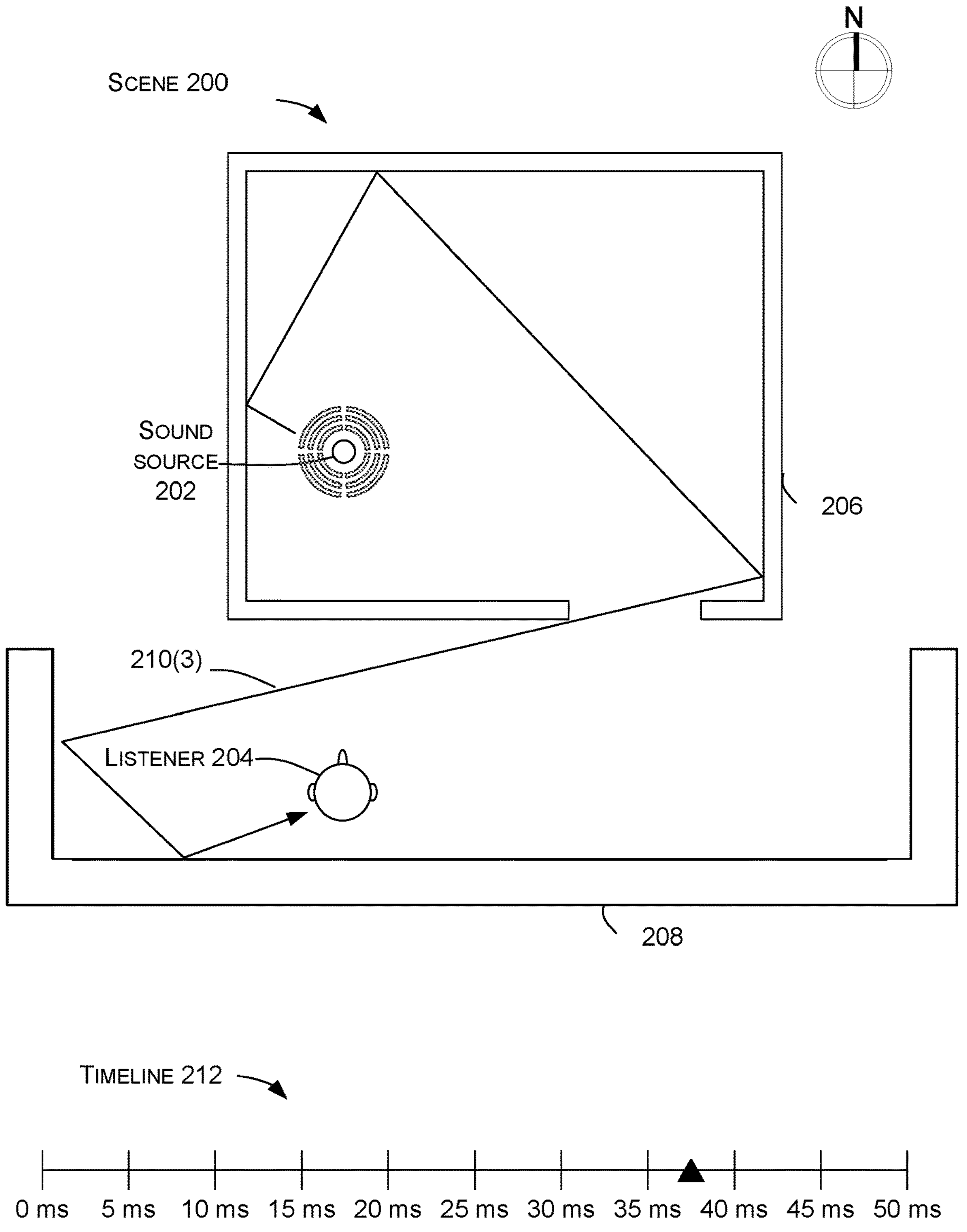

FIGS. 2B, 2C, and 2D illustrate sound wavefronts 210(1), 210(2), and 210(3) separately to show how they arrive at different times at the listener 204. FIG. 2B shows sound wavefront 210(1) arriving at the listener at about 10 milliseconds after the sound is emitted by sound source 202, as conveyed by timeline 212. FIG. 2C shows sound wavefront 210(2) arriving at the listener at about 30 milliseconds after the sound is emitted by sound source 202, as conveyed by timeline 212. FIG. 2C shows sound wavefront 210(3) arriving at the listener at about 37.5 milliseconds after the sound is emitted by sound source 202, as conveyed by timeline 212.

Sound Encoding

Consider a pair of source and listener locations in a given scene, with a sound source located at the source location and a listener located at the listener location. The sound perceived by the listener is generally a function of acoustic properties of the scene as well as the location of the source and listener.

One way to represent acoustic parameters in a given scene is to fix a listener location and encode parameters from different potential source locations for sounds that travel from the potential source locations to the fixed listener location. The result is an acoustic parameter field for that listener location. Note that each of these fields can represent a horizontal "slice" within a given scene. Thus, different acoustic parameter fields can be generated for different vertical heights within a scene to create a volumetric representation of sound travel for the scene with respect to the listener location. Generally, the relative density of each encoded field can be a configurable parameter that varies based on various criteria, where denser fields can be used to obtain more accurate representations and sparser fields can be employed to obtain computational efficiency and/or more compact representations.

Different fields can be used to represent different parameters for each listener location. For instance, coherent parameter fields can include total sound energy, echo count, centroid time, variance time, and directed energy parameters. The directed energy parameter can include a directed unit vector representing an arrival azimuth, an arrival elevation, and a vector length that is inversely related to the extent to which the sound energy is spread out in direction around the arrival azimuth. Incoherent parameter fields can include reverberation energy and decay time. At runtime, source and listener locations for a runtime sound source and listener can be determined, and respective coherent and incoherent parameters determined by interpolating from the runtime source and listener locations to nearby probed listener locations and source locations on a voxel grid.

First Example System

The above discussion provides various examples of acoustic parameters that can be encoded for various scenes. Further, note that these parameters can be simulated and precomputed using isotropic sound sources. At rendering time, sound source and listener locations can be accounted for when rendering sound. Thus, as discussed more below, the disclosed implementations offer the ability to encode perceptual parameters using isotropic sources that allow for runtime rendering of sound.

Figure 3:
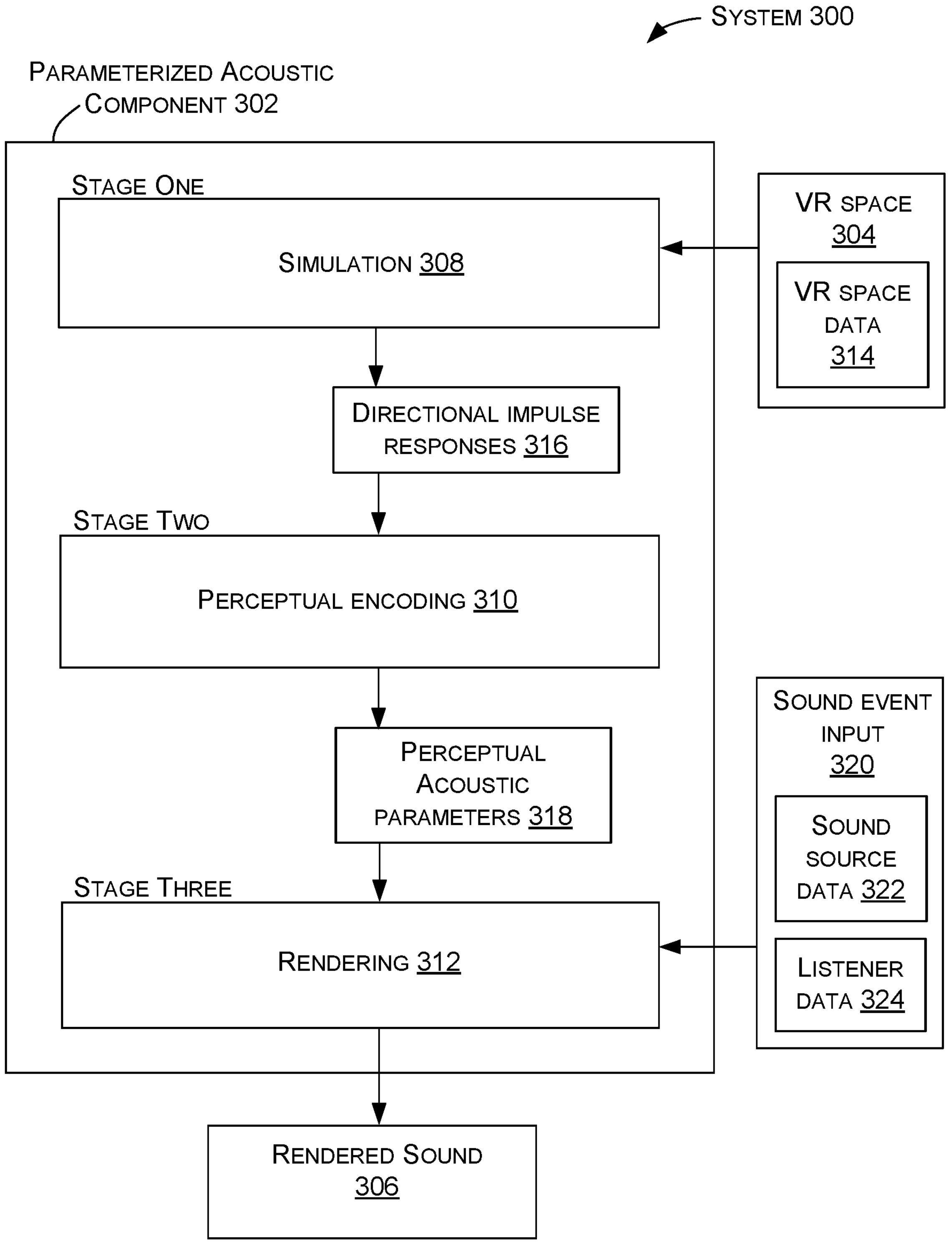
FIGS. 3 and 4 illustrate example systems that are consistent with some implementations of the present concepts.

A first example system 300 is illustrated in FIG. 3. In this example, system 300 can include a parameterized acoustic component 302. The parameterized acoustic component 302 can operate on a scene such as a virtual reality (VR) space 304. In system 300, the parameterized acoustic component 302 can be used to produce realistic rendered sound 306 for the virtual reality space 304. In the example shown in FIG. 3, functions of the parameterized acoustic component 302 can be organized into three Stages. For instance, Stage One can relate to simulation 308, Stage Two can relate to perceptual encoding 310, and Stage Three can relate to rendering 312. Stage One and Stage Two can be implemented as precompute steps, and Stage Three can be performed at runtime. Also shown in FIG. 3, the virtual reality space 304 can have associated virtual reality space data 314. The parameterized acoustic component 302 can also operate on and/or produce directional impulse responses 316, perceptual acoustic parameters 318, and sound event input 320, which can include sound source data 322 and/or listener data 324 associated with a sound event in the virtual reality space 304. In this example, the rendered sound 306 can include coherent and incoherent components.

As illustrated in the example in FIG. 3, at simulation 308 (Stage One), parameterized acoustic component 302 can receive virtual reality space data 314. The virtual reality space data 314 can include geometry (e.g., structures, materials of objects, portals, etc.) in the virtual reality space 304. For instance, the virtual reality space data 314 can include a voxel map for the virtual reality space 304 that maps the geometry, including structures and/or other aspects of the virtual reality space 304. In some cases, simulation 308 can include acoustic simulations of the virtual reality space 304 to precompute fields of coherent and incoherent acoustic parameters, such as those discussed above. More specifically, in this example simulation 308 can include generation of directional impulse responses 316 using the virtual reality space data 314. Pressure and three-dimensional velocity signals of the directional impulse responses 316 can be split into coherent and incoherent components, and perceptual acoustic parameters can be derived from each component. Stated another way, simulation 308 can include using a precomputed wave-based approach to capture the acoustic characteristics of a complex scene.

One approach to encoding perceptual acoustic parameters 318 for virtual reality space 304 would be to generate directional impulse responses 316 for every combination of possible source and listener locations, e.g., every pair of voxels. While ensuring completeness, capturing the complexity of a virtual reality space in this manner can lead to generation of petabyte-scale wave fields. This can create a technical problem related to data processing and/or data storage. The techniques disclosed herein provide solutions for computationally efficient encoding and rendering using relatively compact representations.

As noted above, directional impulse responses 316 can be generated based on probes deployed at particular listener locations within virtual reality space 304. Example probes are shown above in FIG. 1. This involves significantly less data storage than sampling at every potential listener location (e.g., every voxel). The probes can be automatically laid out within the virtual reality space 304 and/or can be adaptively sampled. For instance, probes can be located more densely in spaces where scene geometry is locally complex (e.g., inside a narrow corridor with multiple portals), and located more sparsely in a wide-open space (e.g., outdoor field or meadow). In addition, vertical dimensions of the probes can be constrained to account for the height of human listeners, e.g., the probes may be instantiated with vertical dimensions that roughly account for the average height of a human being. Similarly, potential sound source locations for which directional impulse responses 316 are generated can be located more densely or sparsely as scene geometry permits. Reducing the number of locations within the virtual reality space 304 for which the directional impulse responses 316 are generated can significantly reduce data processing and/or data storage expenses in Stage One.

As shown in FIG. 3, at Stage Two, perceptual encoding 310 can be performed on the directional impulse responses 316 from Stage One. In some implementations, perceptual encoding 310 can work cooperatively with simulation 308 to perform streaming encoding. In this example, the perceptual encoding process can receive and compress individual directional impulse responses as they are being produced by simulation 308. For instance, values can be quantized and techniques such as delta encoding can be applied to the quantized values. Unlike directional impulse responses, perceptual parameters tend to be relatively smooth, which enables more compact compression using such techniques. Taken together, encoding parameters in this manner can significantly reduce storage expense.

Generally, perceptual encoding 310 can involve extracting perceptual acoustic parameters 318 from the directional impulse responses 316. These parameters generally represent how sound from different source locations is perceived at different listener locations. Example parameters are discussed above. For example, the perceptual acoustic parameters for a given source/listener location pair can include first perceptual parameters representing characteristics of coherent signals traveling from source locations to listener locations, and second perceptual parameters representing characteristics of incoherent signals traveling from the source locations to the listener locations. Encoding perceptual acoustic parameters in this manner can yield a manageable data volume for the perceptual acoustic parameters, e.g., in a relatively compact data file that can later be used for computationally efficient rendering of coherent and incoherent sound simultaneously. Some implementations can also encode frequency dependence of materials of a surface that affect the sound response when a sound hits the surface (e.g., changing properties of the resultant echoes).

As shown in FIG. 3, at Stage Three, rendering 312 can utilize the perceptual acoustic parameters 318 to render sound. As mentioned above, the perceptual acoustic parameters 318 can be obtained in advance and stored, such as in the form of a data file. Sound event input 320 can be used to render sound in the scene based on the perceptual acoustic parameters as described more below.

In general, the sound event input 320 shown in FIG. 3 can be related to any event in the virtual reality space 304 that creates a response in sound. The sound source data 322 for a given sound event can include an input sound signal for a runtime sound source and a location of the runtime sound source. For clarity, the term "runtime sound source" is used to refer to the sound source being rendered, to distinguish the runtime sound source from sound sources discussed above with respect to simulation and encoding of parameters.

Similarly, the listener data 324 can convey a location of a runtime listener. The term "runtime listener" is used to refer to the listener of the rendered sound at runtime, to distinguish the runtime listener from listeners discussed above with respect to simulation and encoding of parameters. The listener data can also convey directional hearing characteristics of the listener, e.g., in the form of a head-related transfer function (HRTF).

In some implementations, sounds can be rendered using a lightweight signal processing algorithm. The lightweight signal processing algorithm can render sound in a manner that can be largely computationally cost-insensitive to a number of the sound sources and/or sound events. For example, the parameters used in Stage Two can be selected such that the number of sound sources processed in Stage Three does not linearly increase processing expense.

The sound source data for the input event can include an input signal, e.g., a time-domain representation of a sound such as series of samples of signal amplitude (e.g., 44100 samples per second). The input signal can have multiple frequency components and corresponding magnitudes and phases. The input signal can be rendered at the runtime listener location using separate parameter sets for coherent and incoherent components, as described more below.

Applications

The parameterized acoustic component 302 can operate on a variety of virtual reality spaces 304. For instance, in some cases, a video-game type virtual reality space 304 can be parameterized as described herein. In other cases, virtual reality space 304 can be an augmented conference room that mirrors a real-world conference room. For example, live attendees could be coming and going from the real-world conference room, while remote attendees log in and out. In this example, the voice of a particular live attendee, as rendered in the headset of a remote attendee, could fade away as the live attendee walks out a door of the real-world conference room.

In other implementations, animation can be viewed as a type of virtual reality scenario. In this case, the parameterized acoustic component 302 can be paired with an animation process, such as for production of an animated movie. For instance, as visual frames of an animated movie are generated, virtual reality space data 314 could include geometry of the animated scene depicted in the visual frames. A listener location could be an estimated audience location for viewing the animation. Sound source data 322 could include information related to sounds produced by animated subjects and/or objects. In this instance, the parameterized acoustic component 302 can work cooperatively with an animation system to model and/or render sound to accompany the visual frames.

In another implementation, the disclosed concepts can be used to complement visual special effects in live action movies. For example, virtual content can be added to real world video images. In one case, a real-world video can be captured of a city scene. In post-production, virtual image content can be added to the real-world video, such as an animated character playing a trombone in the scene. In this case, relevant geometry of the buildings surrounding the corner would likely be known for the post-production addition of the virtual image content. Using the known geometry (e.g., virtual reality space data 314) and a position, loudness, and sound characteristics of the trombone (e.g., sound event input 320), the parameterized acoustic component 302 can provide immersive audio corresponding to the enhanced live action movie.

Note also that some implementations can be employed for engineering applications. Consider a concert hall or auditorium design scenario where a designer seeks to optimize acoustic quality for hundreds or thousands of seating locations. By creating different virtual representations of proposed designs, acoustic quality at each listener location (e.g., seat) in each proposed design can be evaluated using the disclosed techniques. Thus, a particular design can be selected that has suitable acoustic characteristics at each listener location, without needing to build a physical model or perform a full path-tracing simulation of each proposed design.

As noted, the parameterized acoustic component 302 can model acoustic effects for arbitrarily moving listener and/or sound sources that can emit any sound signal. The result can be a practical system that can render convincing audio in real-time. Furthermore, the parameterized acoustic component can render convincing audio for complex scenes while solving a previously intractable technical problem of processing petabyte-scale wave fields. As such, the techniques disclosed herein can handle be used to render sound for complex 3D scenes within practical RAM and/or CPU budgets. The result can be a practical system that can produce convincing sound for video games, virtual reality scenarios, or architectural acoustic scenarios.

Second Example System

Figure 4:
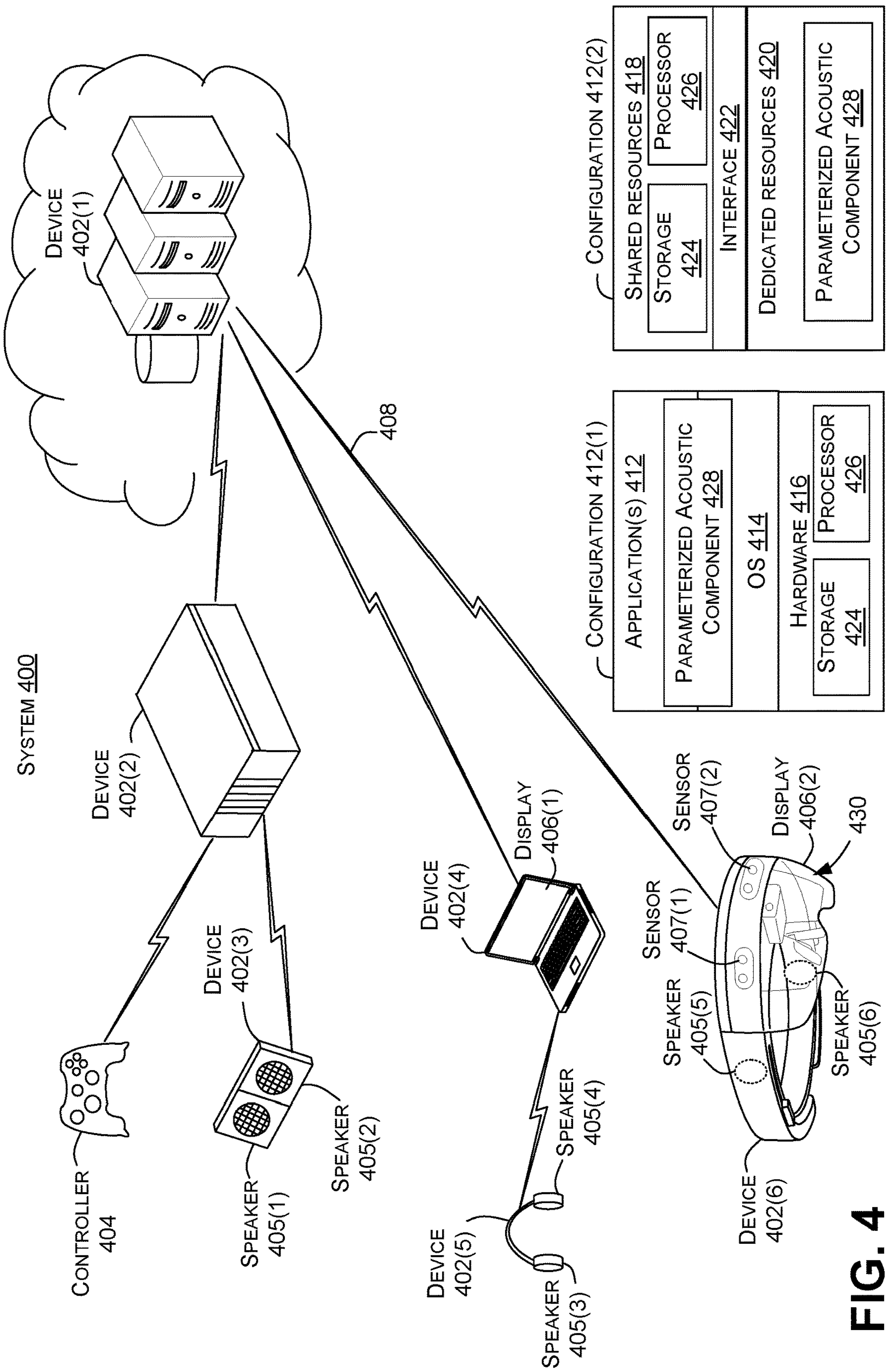

FIG. 4 shows a system 400 that can accomplish parametric encoding and rendering as discussed herein. For purposes of explanation, system 400 can include one or more devices 402. The device may interact with and/or include input devices such as a controller 404, speakers 405, displays 406, and/or sensors 407. The sensors can be manifest as various 2D, 3D, and/or microelectromechanical systems (MEMS) devices. The devices 402, controller 404, speakers 405, displays 406, and/or sensors 407 can communicate via one or more networks (represented by lightning bolts 408).

In the illustrated example, example device 402(1) is manifest as a server device, example device 402(2) is manifest as a gaming console device, example device 402(3) is manifest as a speaker set, example device 402(4) is manifest as a notebook computer, example device 402(5) is manifest as headphones, and example device 402(6) is manifest as a virtual reality device such as a head-mounted display (HMD) device. While specific device examples are illustrated for purposes of explanation, devices can be manifest in any of a myriad of ever-evolving or yet to be developed types of devices.

In one configuration, device 402(2) and device 402(3) can be proximate to one another, such as in a home video game type scenario. In other configurations, devices 402 can be remote. For example, device 402(1) can be in a server farm and can receive and/or transmit data related to the concepts disclosed herein.

FIG. 4 shows two device configurations 410 that can be employed by devices 402. Individual devices 402 can employ either of configurations 410(1) or 410(2), or an alternate configuration. (Due to space constraints on the drawing page, one instance of each device configuration is illustrated rather than illustrating the device configurations relative to each device 402.) Briefly, device configuration 410(1) represents an operating system (OS) centric configuration. Device configuration 410(2) represents a system on a chip (SOC) configuration. Device configuration 410(1) is organized into one or more application(s) 412, operating system 414, and hardware 416. Device configuration 410(2) is organized into shared resources 418, dedicated resources 420, and an interface 422 there between.

In either configuration 410, the device can include storage/memory 424, a processor 426, and/or a parameterized acoustic component 428. In some cases, the parameterized acoustic component 428 can be similar to the parameterized acoustic component 302 introduced above relative to FIG. 3. The parameterized acoustic component 428 can be configured to perform the implementations described above and below.

In some configurations, each of devices 402 can have an instance of the parameterized acoustic component 428. However, the functionalities that can be performed by parameterized acoustic component 428 may be the same or they may be different from one another. In some cases, each device's parameterized acoustic component 428 can be robust and provide all of the functionality described above and below (e.g., a device-centric implementation). In other cases, some devices can employ a less robust instance of the parameterized acoustic component that relies on some functionality to be performed remotely. For instance, the parameterized acoustic component 428 on device 402(1) can perform functionality related to Stages One and Two, described above for a given application, such as a video game or virtual reality application. In this instance, the parameterized acoustic component 428 on device 402(2) can communicate with device 402(1) to receive perceptual acoustic parameters 318. The parameterized acoustic component 428 on device 402(2) can utilize the perceptual parameters with sound event inputs to produce rendered sound 306, which can be played by speakers 405(1) and 405(2) for the user.

In the example of device 402(6), the sensors 407 can provide information about the location and/or orientation of a user of the device (e.g., the user's head and/or eyes relative to visual content presented on the display 406(2)). The location and/or orientation can be used for rendering sounds to the user by treating the user as a listener or, in some cases, as a sound source. In device 402(6), a visual representation (e.g., visual content, graphical use interface) can be presented on display 406(2). In some cases, the visual representation can be based at least in part on the information about the location and/or orientation of the user provided by the sensors. Also, the parameterized acoustic component 428 on device 402(6) can receive perceptual acoustic parameters from device 402(1). In this case, the parameterized acoustic component 428(6) can produce rendered sound in accordance with the representation. Thus, stereoscopic sound can be rendered through the speakers 405(5) and 405(6) representing how coherent and incoherent sound are perceived at the location of the user.

In still another case, Stage One and Two described above can be performed responsive to inputs provided by a video game, a virtual reality application, or an architectural acoustics application. The output of these stages, e.g., perceptual acoustic parameters 318, can be added to an application as a plugin that also contains code for Stage Three. At runtime, when a sound event occurs, the plugin can apply the perceptual parameters to the sound event to compute the corresponding rendered sound for the sound event. In other implementations, the video game, virtual reality application, or architectural acoustics application can provide sound event inputs to a separate rendering component (e.g., provided by an operating system) that renders sound on behalf of the video game, virtual reality application, or architectural acoustics application.

In some cases, the disclosed implementations can be provided by a plugin for an application development environment. For instance, an application development environment can provide various tools for developing video games, virtual reality applications, and/or architectural acoustic applications. These tools can be augmented by a plugin that implements one or more of the stages discussed above. For instance, in some cases, an application developer can provide a description of a scene to the plugin and the plugin can perform the disclosed simulation techniques on a local or remote device, and output encoded perceptual parameters for the scene. In addition, the plugin can implement scene-specific rendering given an input sound signal and information about runtime source and listener locations.

The term "device," "computer," or "computing device" as used herein can mean any type of device that has some amount of processing capability and/or storage capability. Processing capability can be provided by one or more processors that can execute computer-readable instructions to provide functionality. Data and/or computer-readable instructions can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

As mentioned above, device configuration 410(2) can be thought of as a system on a chip (SOC) type design. In such a case, functionality provided by the device can be integrated on a single SOC or multiple coupled SOCs. One or more processors 426 can be configured to coordinate with shared resources 418, such as storage/memory 424, etc., and/or one or more dedicated resources 420, such as hardware blocks configured to perform certain specific functionality. Thus, the term "processor" as used herein can also refer to central processing units (CPUs), graphical processing units (GPUs), field programmable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Parameter Precomputation Method

Detailed example implementations of simulation, encoding, and rendering concepts have been provided above and are further described below. The example methods provided in the next two sections summarize the present concepts.

Figure 5:
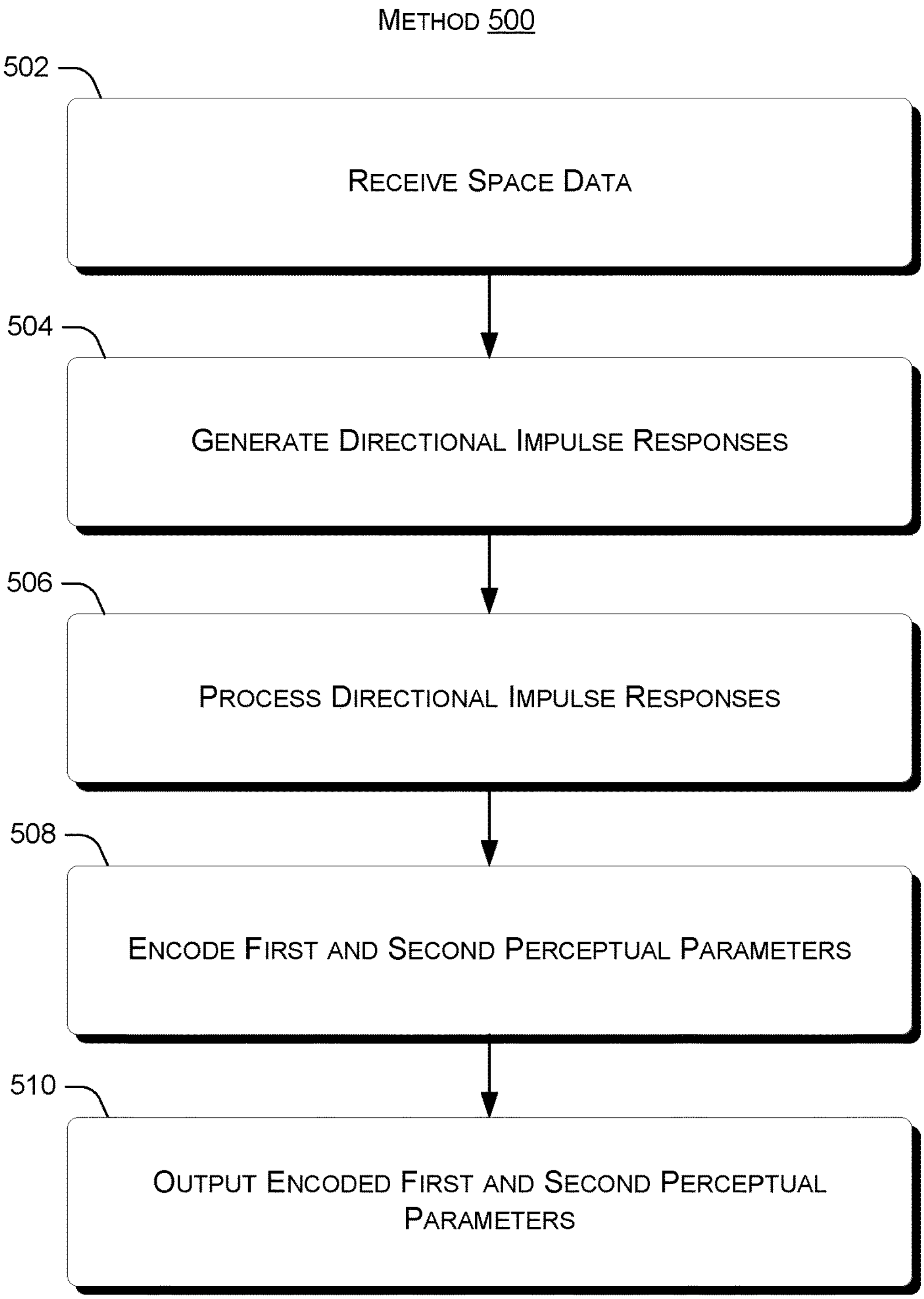
FIGS. 5 and 6 are flowcharts of example methods in accordance with some implementations of the present concepts.

As shown in FIG. 5, at block 502, method 500 can receive virtual reality space data corresponding to a virtual reality space. In some cases, the virtual reality space data can represent a geometry of the virtual reality space. For instance, the virtual reality space data can describe structures, such as walls, floors, ceilings, etc. The virtual reality space data can also include additional information related to the geometry, such as surface texture, material, thickness, etc.

At block 504, method 500 can use the virtual reality space data to generate directional impulse responses for the virtual reality space. In some cases, method 500 can generate the directional impulse responses by simulating initial sounds emanating from multiple moving sound sources and/or arriving at multiple moving listeners.

At block 506, method 500 can process the directional impulse responses to obtain coherent sound signals and incoherent sound signals. For instance, the directional impulse response signal can be split by applying a scalar weighting value a, ranging between zero and 1, to each sample of the directional impulse response signal, as described further below.

At block 508, method 500 can encode first perceptual parameters from the coherent signals and second conceptual parameters from the incoherent signals as described more below.

At block 510, method 500 can output the encoded perceptual parameters. For instance, method 500 can output the encoded perceptual parameters on storage, over a network, via shared memory to an application process, etc.

Rendering Method

Figure 6:
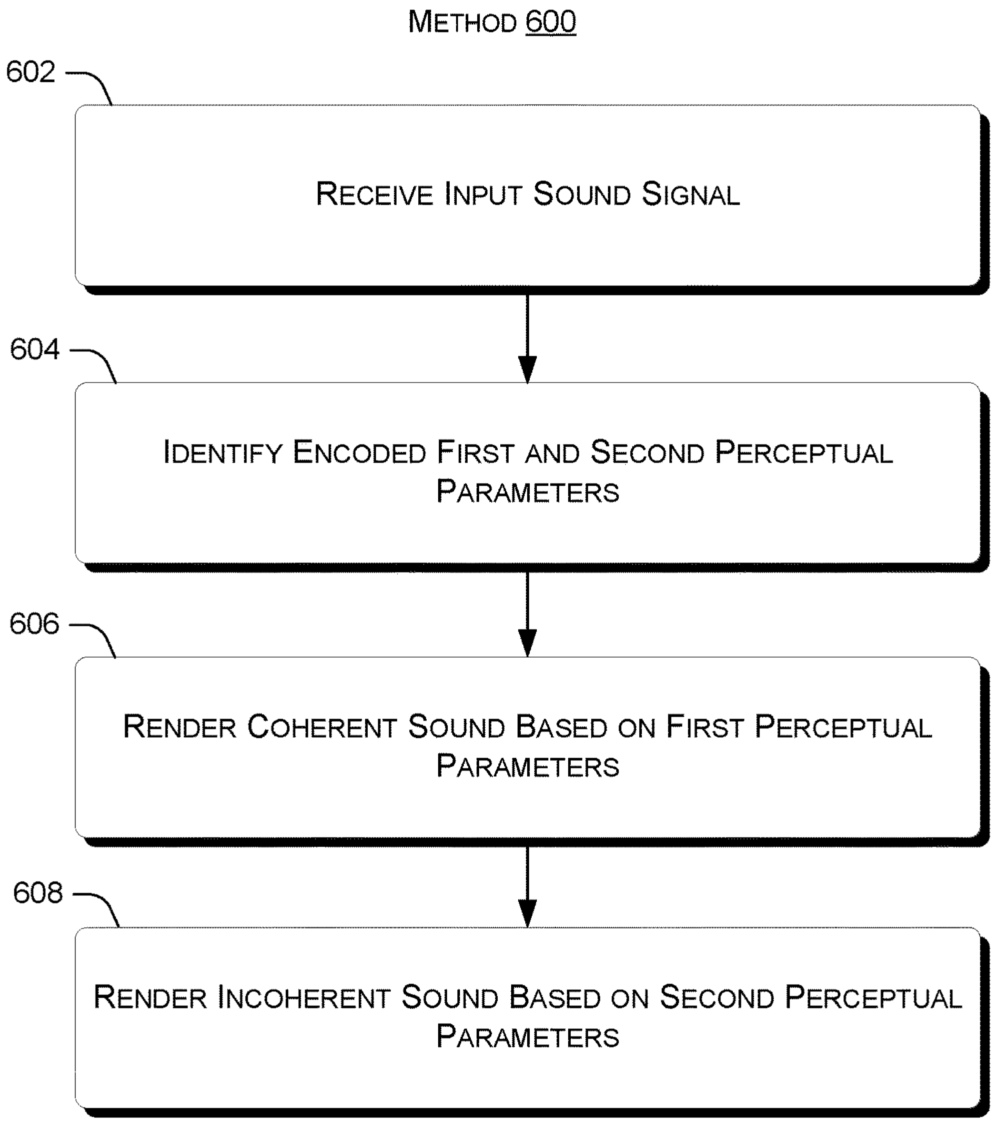

As shown in FIG. 6, at block 602, method 600 can receive an input sound signal for a sound source having a corresponding runtime source location in a scene. For instance, the input sound signal can be time-domain representation of a sound that has multiple frequency components and corresponding magnitudes and phases.

At block 604, method 600 can identify encoded first perceptual parameters and encoded second perceptual parameters for a runtime listener location in the scene. The encoded first perceptual parameters can represent characteristics of coherent signals departing the source location and arriving at the listener location. The encoded second perceptual parameters can represent characteristics of incoherent signals departing the source location and arriving at the listener location. The encoded perceptual parameters can be interpolated to accommodate for differences between the runtime source location and runtime listener location and the source/listener locations for which the encoded parameters were simulated.

At block 606, method 600 can use the input sound signal and the encoded first perceptual parameters to render coherent sound at the listener location.

At block 608, the method 600 can use the input sound signal and the encoded second perceptual parameters to render incoherent sound at the listener location.

Note that blocks 606 and 608 can be performed concurrently. Thus, the sound perceived by the listener can include coherent and incoherent components that are perceived simultaneously by the listener.

Algorithmic Details

The following section describes specific algorithmic details that can be used to implement the disclosed techniques. As noted previously, parameters can be encoded for various potential listener probe locations in a given scene. Consider any one such listener probe. A volumetric wave simulation can be performed from that probe, providing both the scalar pressure, p and 3D particle velocity, v at a dense set of points in 3D space.

The generation of a simulated impulse response can proceed in time-steps. At each step, the next sample of four-channel signal formed by concatenating pressure and velocity, $d(t;x)\equiv\{p(t;x), v(t;x)\}$ can be simulated, for every point x in the simulated volume of space. A perceptual encoding component can extract salient perceptual properties from $d(t;x)$ as a compact set of encoded parameters at each cell yielding a set of parameter fields $P(x)$. These parameter fields can be concatenated over listener probes, stored in a data file that is loaded at runtime, and rendered in real-time.

The following discussion suppresses the spatial dependence via x since the same processing can be repeated at each spatial cell. A set of encoded parameters P can be determined for each listener location. The parameters can be encoded such that salient perceptual aspects of acoustics such as directional echoes and reverberation are captured while employing a compact memory budget. In addition, P can be extracted in an efficient, streaming fashion. To implement the streaming encoding, the signal-processing algorithm that performs the encoding $d(t)\rightarrow P$ can minimize or reduce storage of past history. Failing to do so could exceed the RAM budget on a desktop machine or cloud virtual machine where simulation is performed during offline computation.

The disclosed techniques can be employed for extracting perceptually-salient aspects of directional acoustic impulse responses. Thus, the disclosed techniques can enable high-quality yet real-time rendering of audio-visual scenes in gaming, mixed reality and engineering applications such as architecture. The following concepts can be employed:

1. Streaming coherent-incoherent splitting allows separate perceptual assumptions that can be compactly encoded into two components. A coherent (echo) component contains strong reflections. An incoherent (noise) component contains reverberation.

2. Streaming coherent encoding via adaptive time binning, and storing a small set of parameters in each bin.
3. Streaming incoherent encoding via centroid time and total energy.

The disclosed implementations can split an incoming directional impulse response, sample-by-sample, into two signals: the coherent component isolates echoes as peaked arrivals in time and direction, whereas the incoherent component contains reverberation with numerous arrivals with similar amplitudes that the brain combines into an overall perception. Human auditory perception is sensitive to these two distinct aspects of directional impulse responses, and thus these components can be represented by separate perceptual parameter sets.

In the disclosed implementations, splitting is performed while encoding complex directional impulse responses measured in the real world or accurately simulated with numerical solvers that closely mimic the real world. However, the directional impulse responses generated in the real world or using a numerical solver do not separate coherent and incoherent components of a sound signal. The disclosed implementations can be employed to successfully separate these two components using statistical measures. Thus, the disclosed implementations prove to provide for streaming, on-the-fly encoding of directional impulse responses with knowledge of only the current value and a limited history of past values.

Previous efforts to encode impulse responses of sound have treated coherent and incoherent sound components together. By splitting the impulse responses into separate coherent and incoherent components, strong assumptions about the structure and perception of these separate components can be used to provide a compact encoded representation that can still preserve the perception of the raw input.

Encoding Algorithm

Figure 7:
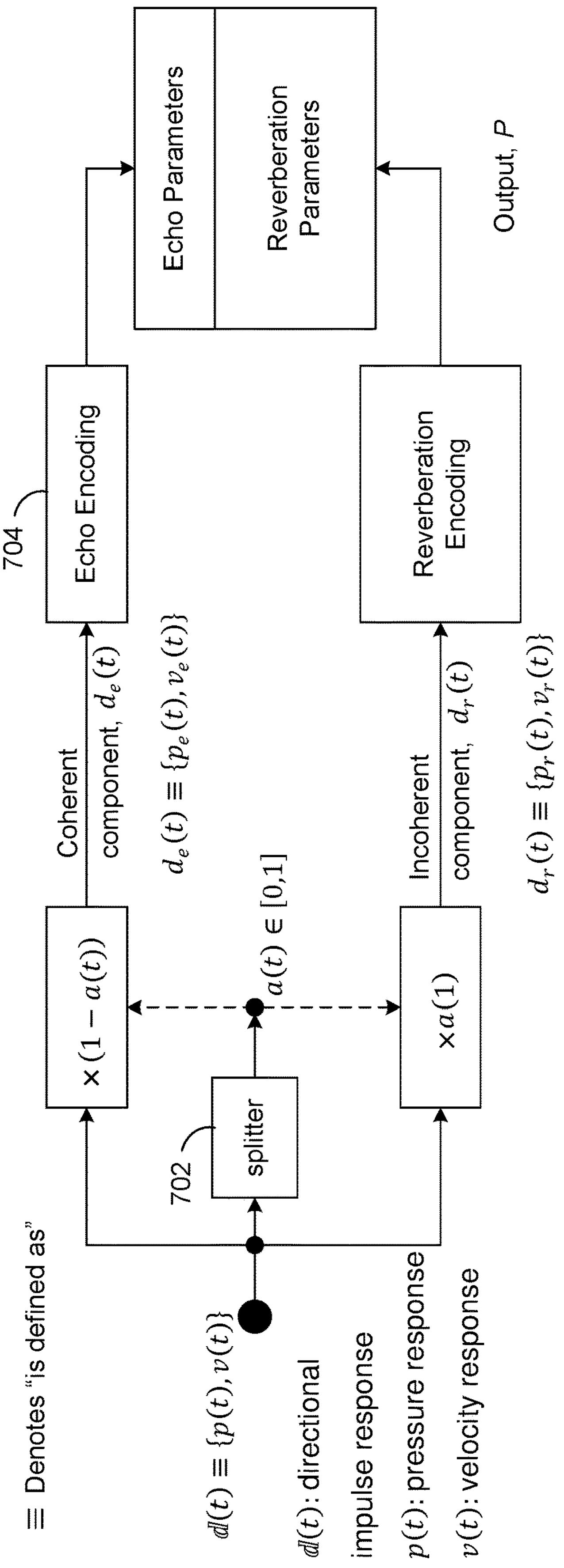
FIG. 7 illustrates a schematic of a streaming encoding algorithm that is consistent with some implementations of the present concepts.

FIG. 7 shows a schematic of an encoder 700. A splitter component 702 determines a degree of incoherence value: $\alpha(t) \in [0,1]$ for each time-sample. When the signal looks like reverberation, this value approaches 1, when it contains one or few outlying large value (echoes), it approaches 0. The splitter component is allowed to keep internal history of past input values. An incoherence measure, $\alpha$ is used to then split the sample at any time instant t, as the echo component: $d_e(t)=(1-\alpha(t))d(t)$ and the reverberation component: $d_r(t)=\alpha(t)d(t)$. Note that information loss can be avoided at this stage because by construction the original response can be recovered: $d(t)=d_e(t)+d_r(t)$.

Figure 8:
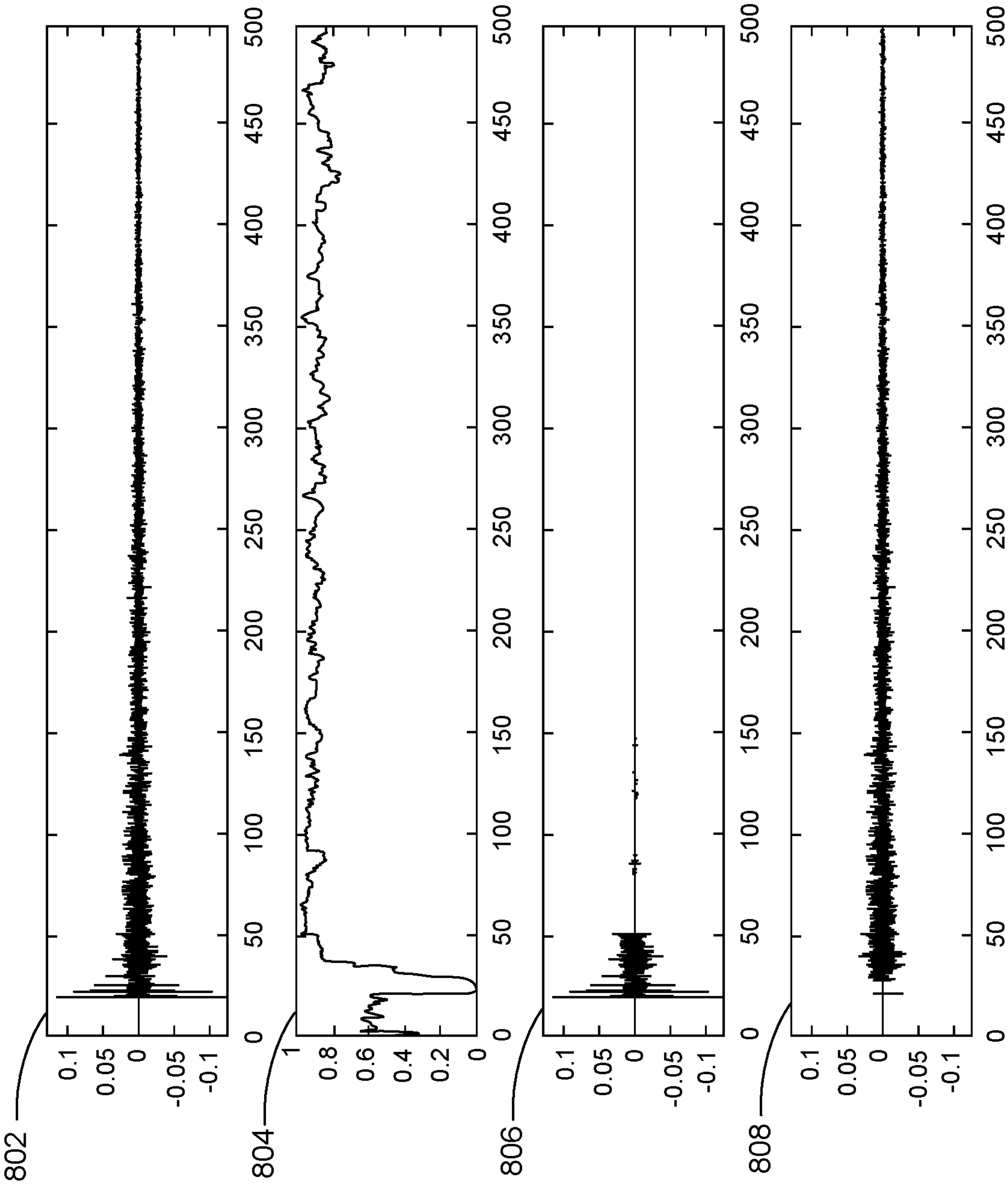
FIG. 8 illustrates an example of a sound signal split into coherent and incoherent components, consistent with some implementations of the present concepts.

An example result of splitting a signal is shown in FIG. 8, with an input pressure response graph 802, degree of incoherence graph 804, coherent component graph 806, and incoherent component graph 808. Note that each signal also can include three velocity component signals that are not shown in FIG. 8.

Consider a time-sample t at which the splitter component 702 receives the four values for the directional impulse response: $d(t)\equiv\{p(t), v(t)\}$. One approach is to first f compute the energy envelope:

$$E_s(t)=\mathcal{L}_{2ms}*p^2(t) \quad (1)$$

by smoothing the instantaneous power, $p^2(t)$, over a period of 2 ms using a low-pass (smoothing) filter $\mathcal{L}$, with * denoting temporal convolution. $\mathcal{L}$ can be normalized appropriately to leave a constant-valued signal unmodified. A Hanning window of 2 ms of history can be used to implement this convolution, or an efficient recursive digital filter could be used instead. This operation can be performed to avoid zero-crossings as the incoherence measure involves a logarithm which is too sensitive to nearly zero values (log of such values approaches—∞).

Next, a flatness measure can be computed on the energy envelope as:

$$\alpha(t) = \frac{\exp(\mathcal{L}_{10ms} * \log E_s(t))}{\mathcal{L}_{10ms} * E_s(t)} \quad (2)$$

This measure is similar to spectral flatness measures that can be employed in speech and music processing literature on frequency-domain data. However, the flatness measure of equation (2) is a general measure of how random/stochastic the signal looks and can be applied to the energy envelope of an impulse response, since reverberation can be well-modeled as a stochastic process. In some implementations, this low-pass filter is implemented via summing over a history buffer of 10 ms duration, but like the energy envelope, a recursive filter implementation could be employed instead.

Coherent (Echo) Encoding

The following describes functionality of the echo encoding component 704 of encoder 700, shown in FIG. 7. In parallel with the splitter component 702, encoder 700 can detect the onset time, $\tau_0$ when the first peak of a given impulse response first peak occurs. The encoding algorithms described below start processing at this onset time. For the following discussion, assume that the time variable has been offset so that t=0 indicates this onset time.

Figure 9:
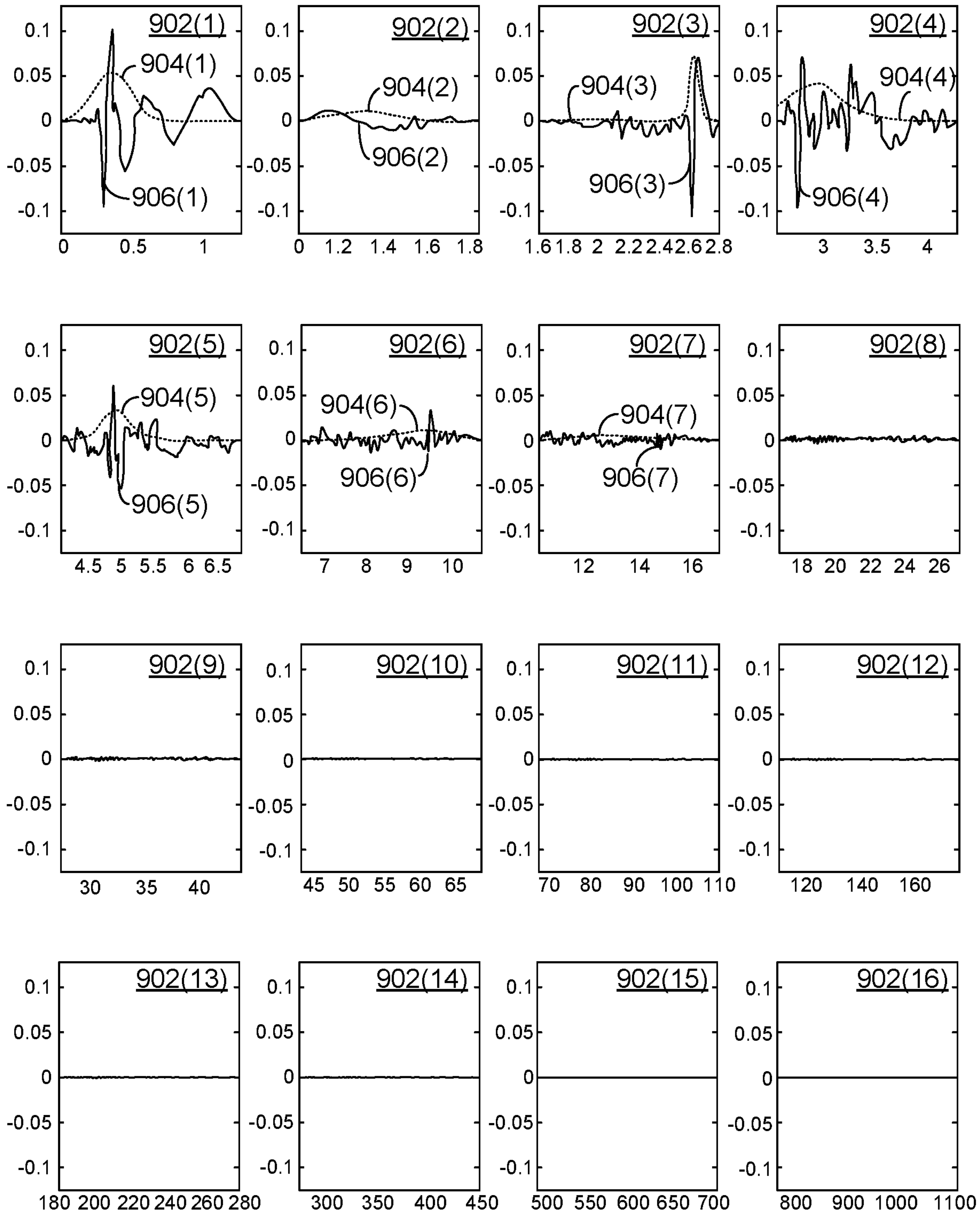
FIG. 9 illustrates adaptive time bins that can be employed to encode coherent sound components, consistent with some implementations of the present concepts.

An adaptive time-binning approach can be employed where the coherent signal is chopped into time windows of exponentially increasing duration, starting at the onset time. FIG. 9 illustrates an example of an adaptive time-binning approach with time bins 902(1) through 902(16). This adaptivity is based on observations about auditory perception, such as the precedence effect. Spatial localization has a fusion interval of 1 ms after onset. Reflections for signals such as clicks, speech, and music can be perceptually fused with the onset over an interval of 10 ms, 50 ms, and 80 ms respectively.

In view of the above characteristics of human auditory perception, a suitably increasing size for binning can capture most of these salient aspects, while requiring far less memory than a constant-sized bin width (e.g., 10 ms). A constant-sized bin width is employed in audio coding applications such as mp3 because there is no special start time—transients can occur at any time in an audio recording, for any number of sounds. Impulse responses are different in that there is a special onset time, and thus strong perceptual assumptions can be made starting at that time, in particular that information closer to the onset time carries higher salience. This allows the disclosed implementations to compactly encode directional impulse responses.

For each time window, the same set of parameters of coherent sound can be extracted. Consider any time bin. First subtract the start-time of the bin so that the bin is spanned by the time range, $t' \in [0, T_b]$ where $T_b$ is the duration of the bin indexed by b. The duration, $T_b$, increases monotonically with bin index.

Each bin can then be characterized by the following parameters:

1. Energy: $E_b \equiv \int_0^{T_b} p_e^2(t')dt'$. Captures the total loudness of arrivals within the bin.
2. Echo count:

$$N_b \equiv \frac{1}{T_b E_b}\left(\int_0^{T_b} |p_e(t')|dt'\right)^2 \in [0, 1].$$

Captures the "burstiness" of energy within a bin: whether it arrives in a single peak or distributed over many. This formulation is one of many possible measures of signal sparsity. In the disclosed implementations, it provides a direct notion of the number of echoes within a time bin for complex responses, while mitigating expensive and error-prone processing for fitting peaks. This approach also has the advantage that it is easily streamed relative to approaches that involve building a histogram. The number of echoes can convey the distinction between, e.g., an empty unfurnished room which will have energy concentrated in a few echoes, versus a furnished room where energy gets distributed into many more echoes due to repeated scattering.

3. Centroid time:

$$C_b \equiv \frac{1}{E_b}\int_0^{T_b} t' p_e^2(t')dt'.$$

captures the notion of the time at which the overall energy arrives within the bin. If there happens to be one peak, this aligns with the peak's delay. If there are many peaks, this value aggregates to an average, approximating perceptual fusion. Again, explicit peak fitting can be avoided by using such a simple and fast measure.

4. Variance time:

$$S_b \equiv \frac{1}{E_b}\int_0^{T_b} t'^2 p_e^2(t')dt'.$$

This parameter models the dispersion, or spread, of arriving energy around the centroid time. The value is small when there is a single, crisp peak, or many peaks clustered close together, and larger when there are similarly-energetic arrivals spread throughout the bin's duration.

5. Directed energy:

$$D_b \equiv \frac{1}{E_b}\int_0^{T_b} p_e^2(t')d_e(t)/|d_e(t)|dt'.$$

The corresponding direction unit vector: $D_b/|D_b|$ is the centroid direction from which energy arrives within this time bin. The length of this vector $|D_b|$ conveys the spread of arriving energy around this centroidal direction, with a value of 1 indicating a single wavefront, and 0 indicates energy arriving isotropically from all directions (or in equal amounts from opposing directions).

Curves 904(1) . . . 904(7) illustrate encoded centroid time, $C_b$, and variance time, $S_b$ for corresponding bins 902(1) . . . 902(7), while curves 906(1) . . . 906(7) represent the corresponding coherent signal for each time bin. Note that curves 904 and 906 are not separately labeled for time bins 902(8) . . . 902(12). Curves 904(1) . . . (7) can be obtained by synthesizing an equivalent Gaussian function that would encode to the same parameters. This illustrates that an exact waveform fitting is not necessarily employed, but rather the aggregate character of when and which direction energy arrives at the listener is obtained. Each of the parameters above is computable in a streaming fashion via accumulators that compute a running sum that approximates the integral terms. Also note that each bin occurs successively in time; thus, once a given bin's end time has been reached, the parameters for the bin may be computed, stored, and accumulators for the integrals reset for the next bin. This limits the memory utilization of the disclosed encoding process. Further, post-processing operators such as the division by $E_b$, or squaring in point 2, as applicable, can be applied during this parameter extraction step when the end time for a given bin is reached.

Incoherent (Reverberation) Encoding

The following describes functionality of the reverberation encoding component 706 of encoder 700, shown in FIG. 7. The incoherent signal includes noise-like elements of the original signal. For this reason, the majority of the incoherent signal can include the exponentially-decaying late reverberant tail of a given impulse response. In order to create a sufficient approximation to the signal, approximate reverberation can be represented as exponentially decaying noise: $p_n^2(t) \approx E_0 \exp(-\beta t)\eta(t)$, where $\beta$ is defined as $\beta \equiv 6 \log 10/T_{60}$ and $\eta(t)$ is Gaussian noise with variance of 1. These two encoded parameters can be used to represent the incoherent component of a given signal: $\{E_0, T_{60}\}$.

One approach would be to extract these parameters on the complete impulse response in logarithmic (dB) domain. This approach turns the exponential decay into a linear ramp allowing a line-fit to yield the parameters, resulting in two parameters. First, strong reflections in the early response can violate the exponential decay model, causing deviations from a linear ramp in log-domain, which in turn causes underestimation of the $T_{60}$ and fluctuations in estimated values across space that have no correspondence to perception. Second, zero crossings in the signal turn to dips towards—∞ in dB domain. Various methods to mitigate this problem tend to introduce other issues in turn. For instance, Schroeder backward integration causes underestimation issues since backward integration in dB domain dips towards—∞ at the end, so manual inspection of the curve is used to fix the line-fitting interval. Backward integration also involves processing the complete response and thus is not suited for streaming.

The disclosed streaming method overcomes these deficiencies with relatively little compute per time-step. First, strong reflections are isolated into the coherent component and suppressed in the incoherent component, thus making exponential decay a better model for the data and thus improving estimation accuracy for the parameters. Second, as described more below, the signal is not converted to log domain, thus mitigating the attendant difficulties discussed above.

From streaming impulse response processing, two quantities can be computed:

$$\text{Energy. } E_r \equiv \int_0^{T_{sim}} p_r^2(t)dt \quad 1.$$

$$\text{Centroid time. } C_r \equiv \frac{1}{E_r}\int_0^{T_{sim}} tp_r^2(t)dt \quad 2.$$

The exponential model can be fit by solving the following relations for the unknown quantities $\{E_0, \beta\}$, $$C_r = \frac{1}{\beta} - \frac{T_{sim}e^{-\beta T_{sim}}}{1-e^{-\beta T_{sim}}} \quad (3\text{ a})$$

$$E_r = E_0\frac{1-e^{-\beta T_{sim}}}{\beta} \quad (3\text{ b})$$

In some implementations, the above relations are solved numerically. One solution technique is to observe that in the asymptotic limit $T_{sim}\rightarrow\infty$, thus obtaining: $C_r\rightarrow 1/\beta$. This asymptotic limit can be employed to produce an initial guess, $\beta^{\infty}=1/C_r$ which can be provided to a standard iterative root-finding method to solve Eq. 3a for β. Then this value can be plugged into Eq. 3b to find $E_0$. Finally, the decay time can be computed as $T_{60}=6\log 10/\beta$. This set of parameters can be extended to each of six axial directions, and can also be extended by encoding different decay times for different frequency bands.

Rendering

Figure 10:
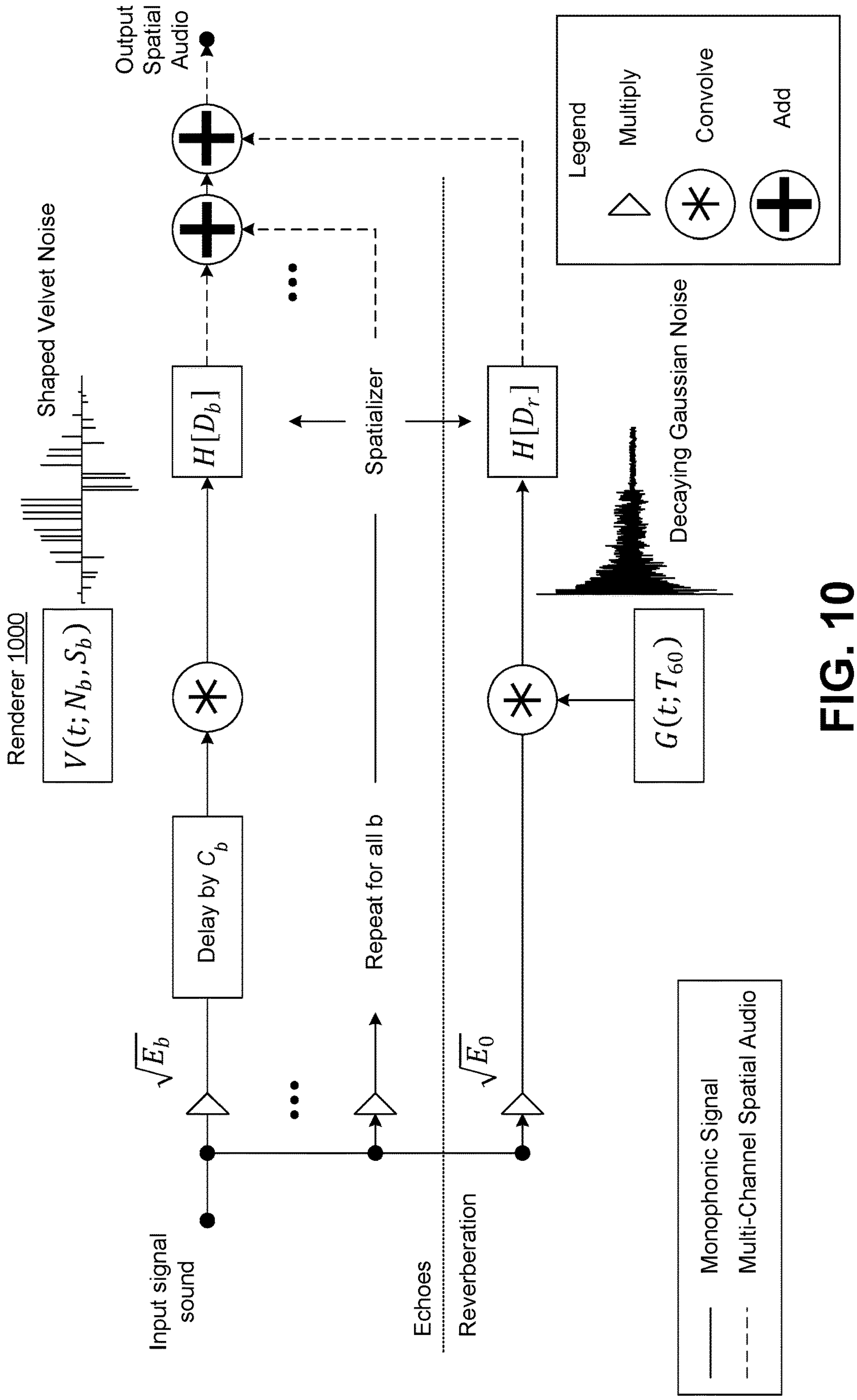
FIG. 10 illustrates a rendering schematic that can be employed to render sound based on encoded parameters, consistent with some implementations of the present concepts.

FIG. 10 illustrates an example renderer 1000 that can be employed to render the encoded parameters for a single input sound source. The functionality of renderer 1000 is described below.

The disclosed encoding process results in two sets of parameters. The coherent parameters are: $\mathcal{P}_e=U_b\{E_b, N_b, C_b, S_b, D_b\}$. That is, $\mathcal{P}_e$ is a concatenation of coherent parameters for all bins, indexed by b. The number of bins is implementation dependent based on how fast the bin size increases, and up to what time the coherent component is encoded. A value of approximately a few hundred milliseconds may be safely above the mixing time of typical spaces of interest. The incoherent parameters are: $\mathcal{P}_r=\{E_r, T_{60}\}$, with possible extension to multiple frequency bands and directions.

The parameters can be decoded at runtime by performing lookups into a dataset based on the current source and listener locations. Vector parameters such as $D_b$ or $D_r$ can be treated as three scalar parameters for the respective Cartesian components.

Renderer 1000 can invoke a few abstract functions as follows:

Shaped Velvet noise, V. Generate $N_b$ random time samples within the time bin with the samples drawn from a Gaussian probability distribution function whose standard deviation is determined by the encoded variance $S_b$. Each is then assigned a random sign of +/−1, with amplitude governed by some smooth shaping curve within the time bin. The resulting pressure signal $V(t; N_b, S_b)$ is such that, if encoded as described above, the echo count $N_b$ and variance time $S_b$ can be recovered. Large latitude is allowed in the precise signal generated at this stage, as long as it satisfies the two parameters, thus allowing selection of signals that are perceptually convincing and efficient to render.

Decaying gaussian noise, $\mathcal{G}$. This can be defined as $\mathcal{G}(t; T_{60})\equiv\eta(t)\exp(-6\log 10\, t/T_{60})$, where $\eta(t)$ is Gaussian noise with variance of 1.

Spatialization, $\mathcal{H}$. An abstract spatializer $\mathcal{H}$[D] that takes a monophonic input signal, and depending on the direction parameter D ($D_b$ or $D_r$ as the case may be) computes multi-channel spatial audio signals that create the impression of the sound arriving from centroid direction D/|D|. For instance, an HRTF spatializer may be used to produce binaural stereo signals for headphone playback.

In addition, if the spatializer supports rendering directional spread such as via the notion of object size, the vector length |D| can be used to compute the equivalent angle of a cone with the centroid direction as central axis. Assuming equal-probability of energy arriving over a cone to result in the observed value, the equivalent cone angle $\Theta_D$ obeys:

$$|D| = \frac{\sin(\Theta_D/2)}{\Theta_D/2}, \Theta_D \in [0, 2\pi) \quad (4)$$

A precomputed lookup table can be employed to solve equation (4). If the spatializer expects direction and spread as separate parameters, they may be then equivalently provided as $\mathcal{H}[D/|D|, \Theta_D]$.

Conclusion

The description relates to parameterize encoding and rendering of sound. The disclosed techniques and components can be used to create accurate acoustic parameters for video game scenes, virtual reality scenes, architectural acoustic scenes, or other applications. The parameters can be used to render sound with higher fidelity, more realistic sound than available through other sound modeling and/or rendering methods. Furthermore, the parameters can be stored and employed for rendering within reasonable processing and/or storage budgets.

The methods described above and below can be performed by the systems and/or devices described above, and/or by other devices and/or systems. The order in which the methods are described is not intended to be construed as a limitation, and any number of the described acts can be combined in any order to implement the methods, or an alternate method(s). Furthermore, the methods can be implemented in any suitable hardware, software, firmware, or combination thereof, such that a device can implement the methods. In one case, the method or methods are stored on computer-readable storage media as a set of computer-readable instructions such that execution by a computing device causes the computing device to perform the method(s).

Although techniques, methods, devices, systems, etc., are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

Various examples are described above. Additional examples are described below. One example includes a method comprising generating directional impulse responses for a scene, the directional impulse responses corresponding to sound departing from multiple sound source locations and arriving at multiple listener locations in the scene, processing the directional impulse responses to obtain coherent sound signals and incoherent sound signals, encoding first perceptual acoustic parameters from the coherent sound signals and second perceptual acoustic parameters from the incoherent sound signals, and outputting the encoded first perceptual acoustic parameters and the encoded second perceptual acoustic parameters.

Another example can include any of the above and/or below examples where the encoding comprises generating first acoustic parameter fields of the first perceptual acoustic parameters and second acoustic parameter fields of the second perceptual acoustic parameters, each first acoustic parameter field having a set of first perceptual acoustic parameters representing characteristics of the coherent sound signals arriving at a particular listener location from the multiple sound source locations, and each second acoustic parameter field having a set of second perceptual acoustic parameters representing characteristics of the incoherent sound signals arriving at the particular listener location from the multiple sound source locations.

Another example can include any of the above and/or below examples where wherein processing the directional impulse responses comprises splitting pressure signals and velocity signals of the directional impulse responses to obtain the coherent sound signals and the incoherent sound signals.

Another example can include any of the above and/or below examples where the method further comprises determining scalar values for respective samples of the pressure signals, the scalar values characterizing incoherence of the respective samples and modifying the respective samples of the pressure signals based at least on the scalar values to extract the coherent sound signals and the incoherent sound signals.

Another example can include any of the above and/or below examples where the encoding comprises determining the first perceptual acoustic parameters for a plurality of time bins.

Another example can include any of the above and/or below examples where the time bins have monotonically increasing durations.

Another example can include any of the above and/or below examples where the first perceptual acoustic parameters for a particular time bin include a total sound energy of the particular time bin.

Another example can include any of the above and/or below examples where the first perceptual acoustic parameters for a particular time bin include an echo count for the particular time bin, the echo count representing a number of coherent sound reflections in the particular time bin.

Another example can include any of the above and/or below examples where the first perceptual acoustic parameters for a particular time bin include a centroid time for the particular time bin, the centroid time representing a particular time in the particular time bin where peak sound energy is present.

Another example can include any of the above and/or below examples where the first perceptual acoustic parameters for a particular time bin include a variance time for the particular time bin, the variance time representing the extent to which sound energy is spread out in time within the particular time bin.

Another example can include any of the above and/or below examples where the first perceptual acoustic parameters for a particular time bin include a directed energy parameter representing an arrival direction of sound energy at the listener location.

Another example can include any of the above and/or below examples where the directed energy parameter includes an arrival azimuth, an arrival elevation, and a vector length.

Another example can include any of the above and/or below examples where the vector length of the directed energy parameter is inversely related to the extent to which the sound energy is spread out in direction around the arrival azimuth.

Another example can include any of the above and/or below examples where the method further comprises determining a centroid time for the incoherent sound signals and determining reverberation energy and decay time based at least on the centroid time, the encoded second perceptual parameters including the reverberation energy and the decay time.

Another example can include a system comprising a processor and storage storing computer-readable instructions which, when executed by the processor, cause the system to receive an input sound signal for a sound source having a source location in a scene, identify encoded first perceptual acoustic parameters and encoded second perceptual acoustic parameters for a listener location in the scene, the encoded first perceptual acoustic parameters representing characteristics of coherent sound signals departing the source location and arriving at the listener location, the encoded second perceptual acoustic parameters representing characteristics of incoherent sound signals departing the source location and arriving at the listener location, render coherent sound at the listener location based at least on the input sound signal and the encoded first perceptual acoustic parameters, and render incoherent sound at the listener location based at least on the input sound signal and the encoded second perceptual acoustic parameters.

Another example can include any of the above and/or below examples where the computer-readable instructions, when executed by the processor, cause the system to spatialize the coherent sound and the incoherent sound at the listener location.

Another example can include any of the above and/or below examples where the computer-readable instructions, when executed by the processor, cause the system to render the coherent sound using shaped noise based at least on an echo count parameter obtained from the encoded first perceptual acoustic parameters.

Another example can include any of the above and/or below examples where the computer-readable instructions, when executed by the processor, cause the system to render the coherent sound using shaped noise based at least on a variance time parameter obtained from the encoded first perceptual acoustic parameters.

Another example can include any of the above and/or below examples where the computer-readable instructions, when executed by the processor, cause the system to render the incoherent sound using Gaussian noise based at least on reverberation energy and decay time parameters obtained from the encoded second perceptual acoustic parameters.

Another example can include a computer-readable storage medium storing computer-readable instructions which, when executed, cause a processor to perform acts comprising processing directional impulse responses corresponding to sound departing from multiple sound source locations and arriving at multiple listener locations in a scene to obtain coherent sound signals and incoherent sound signals, encoding first perceptual acoustic parameters from the coherent sound signals and second perceptual acoustic parameters from the incoherent sound signals, and outputting the encoded first perceptual acoustic parameters and the encoded second perceptual acoustic parameters, the encoded first perceptual acoustic parameters providing a basis for subsequent rendering of coherent sound and the encoded second perceptual acoustic parameters providing a basis for subsequent rendering of incoherent sound traveling from various source locations to various listener locations in the scene.

The invention claimed is:

1. A method comprising:

generating directional impulse responses for a scene, the directional impulse responses corresponding to sound departing from multiple sound source locations and arriving at multiple listener locations in the scene;

processing the directional impulse responses to obtain coherent sound signals and incoherent sound signals that at least partially overlap in time with the coherent sound signals;

encoding first perceptual acoustic parameters from the coherent sound signals and second perceptual acoustic parameters from the incoherent sound signals; and outputting the encoded first perceptual acoustic parameters and the encoded second perceptual acoustic parameters.

2. The method of claim 1, wherein the encoding comprises:

generating first acoustic parameter fields of the first perceptual acoustic parameters and second acoustic parameter fields of the second perceptual acoustic parameters, each first acoustic parameter field having a set of first perceptual acoustic parameters representing characteristics of the coherent sound signals arriving at a particular listener location from the multiple sound source locations, and each second acoustic parameter field having a set of second perceptual acoustic parameters representing characteristics of the incoherent sound signals arriving at the particular listener location from the multiple sound source locations.

3. The method of claim 1, wherein processing the directional impulse responses comprises splitting pressure signals and velocity signals of the directional impulse responses to obtain the coherent sound signals and the incoherent sound signals.

4. The method of claim 3, further comprising:

determining scalar values for respective samples of the pressure signals, the scalar values characterizing incoherence of the respective samples; and modifying the respective samples of the pressure signals based at least on the scalar values to extract the coherent sound signals and the incoherent sound signals.

5. The method of claim 1, wherein the encoding comprises:

determining the first perceptual acoustic parameters for a plurality of time bins.

6. The method of claim 5, wherein the time bins have monotonically increasing durations.

7. The method of claim 5, wherein the first perceptual acoustic parameters for a particular time bin include a total sound energy of the particular time bin.

8. The method of claim 5, wherein the first perceptual acoustic parameters for a particular time bin include an echo count for the particular time bin, the echo count representing a number of coherent sound reflections in the particular time bin.

9. The method of claim 5, wherein the first perceptual acoustic parameters for a particular time bin include a centroid time for the particular time bin, the centroid time representing a particular time in the particular time bin where peak sound energy is present.

10. The method of claim 9, wherein the first perceptual acoustic parameters for a particular time bin include a variance time for the particular time bin, the variance time representing the extent to which sound energy is spread out in time within the particular time bin.

11. The method of claim 5, wherein the first perceptual acoustic parameters for a particular time bin include a directed energy parameter representing an arrival direction of sound energy at the listener location.

12. The method of claim 11, wherein the directed energy parameter includes an arrival azimuth, an arrival elevation, and a vector length.

13. The method of claim 12, wherein the vector length of the directed energy parameter is inversely related to the extent to which the sound energy is spread out in direction around the arrival azimuth.

14. The method of claim 1, further comprising:

determining a centroid time for the incoherent sound signals; and determining reverberation energy and decay time based at least on the centroid time, the encoded second perceptual acoustic parameters including the reverberation energy and the decay time.

15. A system, comprising:

a processor; and storage storing computer-readable instructions which, when executed by the processor, cause the system to:

receive an input sound signal for a sound source having a source location in a scene;

identify encoded first perceptual acoustic parameters and encoded second perceptual acoustic parameters for a listener location in the scene, the encoded first perceptual acoustic parameters representing characteristics of coherent sound signals departing the source location and arriving at the listener location, the encoded second perceptual acoustic parameters representing characteristics of incoherent sound signals departing the source location and arriving at the listener location;

render coherent sound at the listener location based at least on the input sound signal and the encoded first perceptual acoustic parameters; and render incoherent sound at the listener location based at least on the input sound signal and the encoded second perceptual acoustic parameters, the rendered incoherent sound at least partially overlapping with the rendered coherent sound.

16. The system of claim 15, wherein the computer-readable instructions, when executed by the processor, cause the system to:

spatialize the coherent sound and the incoherent sound at the listener location.

17. The system of claim 15, wherein the computer-readable instructions, when executed by the processor, cause the system to:

render the coherent sound using shaped noise based at least on an echo count parameter obtained from the encoded first perceptual acoustic parameters.

18. The system of claim 15, wherein the computer-readable instructions, when executed by the processor, cause the system to:

render the coherent sound using shaped noise based at least on a variance time parameter obtained from the encoded first perceptual acoustic parameters.

19. The system of claim 15, wherein the computer-readable instructions, when executed by the processor, cause the system to:

render the incoherent sound using Gaussian noise based at least on reverberation energy and decay time parameters obtained from the encoded second perceptual acoustic parameters.

20. A computer-readable storage medium storing computer-readable instructions which, when executed, cause a processor to perform acts comprising:

processing directional impulse responses corresponding to sound departing from multiple sound source locations and arriving at multiple listener locations in a scene to obtain coherent sound signals and incoherent sound signals that at least partially overlap in time with the coherent sound signals;

encoding first perceptual acoustic parameters from the coherent sound signals and second perceptual acoustic parameters from the incoherent sound signals; and outputting the encoded first perceptual acoustic parameters and the encoded second perceptual acoustic parameters, the encoded first perceptual acoustic parameters providing a basis for subsequent rendering of coherent sound and the encoded second perceptual acoustic parameters providing a basis for subsequent rendering of incoherent sound traveling from various source locations to various listener locations in the scene.

* * * * *